United States Patent
Tomikawa

(10) Patent No.: US 12,272,499 B2
(45) Date of Patent: Apr. 8, 2025

(54) MULTILAYER CERAMIC ELECTRONIC COMPONENT AND METHOD OF MANUFACTURING THE SAME

(71) Applicant: TAIYO YUDEN CO., LTD., Tokyo (JP)

(72) Inventor: Chizuru Tomikawa, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 154 days.

(21) Appl. No.: 18/174,240

(22) Filed: Feb. 24, 2023

(65) Prior Publication Data

US 2023/0282421 A1   Sep. 7, 2023

(30) Foreign Application Priority Data

Mar. 7, 2022 (JP) ................. 2022-034024

(51) Int. Cl.
  *H01G 4/30*    (2006.01)
  *H01G 4/012*   (2006.01)
  *H01G 4/12*    (2006.01)
  *H01G 4/232*   (2006.01)
  *H01G 4/248*   (2006.01)

(52) U.S. Cl.
  CPC .............. *H01G 4/30* (2013.01); *H01G 4/012* (2013.01); *H01G 4/12* (2013.01); *H01G 4/232* (2013.01); *H01G 4/248* (2013.01)

(58) Field of Classification Search
  CPC .......... H01G 4/30; H01G 4/012; H01G 4/12; H01G 4/232; H01G 4/248; H01G 4/32
  See application file for complete search history.

(56) References Cited

U.S. PATENT DOCUMENTS

| 9,202,629 | B2 * | 12/2015 | Kim | ................ | H01G 4/012 |
| 2008/0212257 | A1 * | 9/2008 | Sakamoto | ............. | H01G 4/012 |
| | | | | | 29/25.42 |

(Continued)

FOREIGN PATENT DOCUMENTS

| JP | 2004-311985 A |    | 11/2004 |
| JP | 2013093522 A | * | 5/2013 |

(Continued)

*Primary Examiner* — Michael P McFadden
(74) *Attorney, Agent, or Firm* — CHEN YOSHIMURA LLP

(57) ABSTRACT

A multilayer ceramic electronic component includes a ceramic body including ceramic layers stacked in a first axis direction and internal electrodes disposed between the plurality of ceramic layers and alternately led out to respective sides along a second axis direction orthogonal to the first axis direction, and external electrodes connected to the internal electrodes and opposed to each other in the second axis direction across the ceramic body. The internal electrodes include first and second peripheral internal electrodes collectively disposed in first and second peripheral portions at respective outer sides in the first axis direction, respectively and central internal electrodes collectively disposed closer to a center in the first axis direction than the first and second peripheral internal electrodes, and each of the first and second peripheral internal electrodes has a higher content ratio of ceramic particles than each of the central internal electrodes.

3 Claims, 14 Drawing Sheets

(56) References Cited

U.S. PATENT DOCUMENTS

| | | | | |
|---|---|---|---|---|
| 2014/0355176 A1* | 12/2014 | Lee | ............... | H01G 4/30 |
| | | | | 361/306.3 |
| 2014/0355177 A1* | 12/2014 | Lee | ............... | H01G 4/012 |
| | | | | 29/25.03 |
| 2016/0181019 A1* | 6/2016 | Park | ............... | H01G 4/12 |
| | | | | 361/301.4 |
| 2018/0182549 A1* | 6/2018 | Koide | ............... | C04B 35/638 |
| 2019/0304696 A1* | 10/2019 | Kim | ............... | H01G 4/12 |
| 2019/0362896 A1* | 11/2019 | Yoon | ............... | H01G 4/008 |
| 2023/0071865 A1* | 3/2023 | Oh | ............... | C22C 1/04 |

FOREIGN PATENT DOCUMENTS

JP        2015141982 A * 8/2015
KR     20140086876 A * 7/2014

* cited by examiner

MULTILAYER CERAMIC ELECTRONIC COMPONENT AND METHOD OF MANUFACTURING THE SAME

FIELD

A certain aspect of the present disclosure relates to a multilayer ceramic electronic component and a method of manufacturing the same.

BACKGROUND

A multilayer ceramic electronic component has a structure designed to have a plurality of ceramic layers and a plurality of internal electrodes alternately stacked. Such a multilayer ceramic electronic component is produced by, for example, stacking ceramic green sheets on which unfired electrode layers made of a conductive paste or the like are formed and firing the resulting multilayer structure. By firing, the unfired electrode layers become internal electrodes, and the ceramic green sheets become ceramic layers.

Ceramic materials have a higher sintering temperature than metals. Therefore, the ceramic green sheet and the electrode layer containing a metal exhibit different sintering behaviors. In the firing step, since the temperature is increased to the sintering temperature of the ceramic material, the electrode layer is excessively sintered and spheroidization or discontinuity of the electrode layer is likely to occur. For example, Japanese Patent Application Laid-Open No. 2004-311985 (Patent Document 1) discloses a technique in which ceramic particles are added to a paste for forming an internal electrode in order to inhibit spheroidization and discontinuity of the internal electrode.

Related Art Documents

Patent Documents

Japanese Patent Application Laid-Open No. 2004-311985

SUMMARY

On the other hand, as electronic components become smaller and more functional in recent years, the internal electrodes and the ceramic layers become thinner, and the number of stacked internal electrodes tends to increase. For this reason, the distortion of the entire multilayer ceramic electronic component due to the spheroidization or discontinuity of the internal electrodes is more likely to occur. Furthermore, as the number of stacked internal electrodes increases, the amount of contraction in the stacking direction of the section in which the internal electrodes are stacked increases during firing of the ceramic body. As a result, a large stress is generated in the peripheral section of the ceramic body in the stacking direction, and structural defects such as cracks are likely to occur.

An object of the present disclosure is to provide a multilayer ceramic electronic component and a method of manufacturing the same that can increase the number of the internal electrodes and inhibit structural defects of a ceramic body.

In one aspect of the present disclosure, there is provided a multilayer ceramic electronic component including: a ceramic body including: an electrode-stacked portion that includes a plurality of ceramic layers stacked in a direction of a first axis and a plurality of internal electrodes disposed between the plurality of ceramic layers and alternately led out to respective sides along a second axis orthogonal to the first axis, first and second cover portions opposed to each other in the direction of the first axis with the electrode-stacked portion interposed therebetween, and first and second side margin portions opposed to each other in a direction of a third axis orthogonal to the first axis and the second axis with the electrode-stacked portion interposed therebetween; and first and second external electrodes connected to the plurality of internal electrodes and opposed to each other in a direction of the second axis across the ceramic body, wherein a dimension in the direction of the first axis of the ceramic body is larger than a dimension in the direction of the third axis of the ceramic body, the plurality of internal electrodes include: a plurality of first peripheral internal electrodes collectively disposed in a peripheral portion at a side of the first cover portion in the direction of the first axis, a plurality of second peripheral internal electrodes collectively disposed in another peripheral portion at a side of the second cover portion in the direction of the first axis, and a plurality of central internal electrodes collectively disposed closer to a center in a direction of the first axis than the plurality of first peripheral internal electrodes and the plurality of second peripheral internal electrodes, and each of the plurality of first peripheral internal electrodes and the plurality of second peripheral internal electrodes has a higher content ratio of ceramic particles than each of the plurality of central internal electrodes.

In another aspect of the present disclosure, there is provided a multilayer ceramic electronic component including: a ceramic body including: an electrode-stacked portion that includes a plurality of ceramic layers stacked in a direction of a first axis and a plurality of internal electrodes disposed between the plurality of ceramic layers and alternately led out to respective sides along a second axis orthogonal to the first axis, first and second cover portions opposed to each other in the direction of the first axis with the electrode-stacked portion interposed therebetween, and first and second side margin portions opposed to each other in a direction of a third axis orthogonal to the first axis and the second axis with the electrode-stacked portion interposed therebetween; and first and second external electrodes connected to the plurality of internal electrodes and opposed to each other in a direction of the second axis across the ceramic body, wherein a dimension in the direction of the first axis of the ceramic body is larger than a dimension in the direction of the third axis of the ceramic body, and wherein the plurality of internal electrodes contain ceramic particles, and wherein the plurality of internal electrodes include: a plurality of first peripheral internal electrodes collectively disposed in a peripheral portion at a side of the first cover portion in the direction of the first axis, a plurality of second peripheral internal electrodes collectively disposed in another peripheral portion at a side of the second cover portion in the direction of the first axis, and a plurality of central internal electrodes collectively disposed closer to a center in the direction of the first axis than the plurality of first peripheral internal electrodes and the plurality of second peripheral internal electrodes, and wherein an average particle size of ceramic particles contained in each of the plurality of first peripheral internal electrodes and the plurality of second peripheral internal electrodes is larger than an average particle size of ceramic particles contained in each of the plurality of central internal electrodes.

In another aspect of the present disclosure, there is provided a multilayer ceramic electronic component including: a ceramic body including: an electrode-stacked portion that includes a plurality of ceramic layers stacked in a direction of a first axis and a plurality of internal electrodes disposed between the plurality of ceramic layers and alternately led out to respective sides along a second axis orthogonal to the first axis, first and second cover portions opposed to each other in the direction of the first axis with the electrode-stacked portion interposed therebetween, and first and second side margin portions opposed to each other in a direction of a third axis orthogonal to the first axis and the second axis with the electrode-stacked portion interposed therebetween; and first and second external electrodes connected to the plurality of internal electrodes and opposed to each other in a direction of the second axis across the ceramic body, wherein a dimension in the direction of the first axis of the ceramic body is larger than a dimension in the direction of the third axis of the ceramic body, wherein the plurality of internal electrodes include: a plurality of first peripheral internal electrodes collectively disposed in a peripheral portion at a side of the first cover portion in the direction of the first axis, a plurality of second peripheral internal electrodes collectively disposed in another peripheral portion at a side of the second cover portion in the direction of the first axis, and a plurality of central internal electrodes collectively disposed closer to a center in the direction of the first axis than the plurality of first peripheral internal electrodes and the plurality of second peripheral internal electrodes, and wherein each of the plurality of first peripheral internal electrodes and the plurality of second peripheral internal electrodes is thicker in the direction of the first axis than each of the plurality of central internal electrodes.

In the above configurations, the first and second peripheral internal electrodes have lower sinterability than the plurality of central internal electrodes. For this reason, excessive sintering of the first and second peripheral internal electrodes is inhibited, and spheroidization and discontinuity are inhibited. Therefore, distortion is inhibited particularly in the peripheral portion in the direction of the first axis of the ceramic body. In addition, the thermal contraction behaviors of the first and second peripheral internal electrodes becomes close to those of the cover portion, the side margin portion, and the like, which have low sinterability, so that stress therebetween is reduced. Therefore, even in the ceramic body in which the dimension in the direction of the first axis is larger than the dimension in the direction of the third axis, it is possible to inhibit structural defects such as cracks in the peripheral portion in the direction of the first axis of the ceramic body.

Positions of ends of the plurality of internal electrodes in the direction of the third axis may be aligned with each other within a range of 0.5 μm in the direction of the third axis.

The electrode-stacked portion may be divided along the direction of the first axis into a first peripheral section in which the plurality of first peripheral internal electrodes are disposed, a central section in which the plurality of central internal electrodes are disposed, and a second peripheral section in which the plurality of second peripheral internal electrodes are disposed, and a dimension of each of the first and second peripheral sections in the direction of the first axis may be 10% or greater and 30% or less of a dimension of the electrode-stacked portion in the direction of the first axis.

In another aspect of the present disclosure, there is provided a method of manufacturing a multilayer ceramic electronic component, the method including: preparing a plurality of central ceramic sheets on which first electrode layers are formed, a plurality of peripheral ceramic sheets on which second electrode layers having lower sinterability than the first electrode layers are formed, and a plurality of cover ceramic sheets including no internal electrode; stacking the plurality of central ceramic sheets in a direction of a first axis, stacking the plurality of peripheral ceramic sheets on both sides in the direction of the first axis of the plurality of central ceramic sheets that have been stacked, stacking the plurality of cover ceramic sheets on both sides in the direction of the first axis of the plurality of peripheral ceramic sheets that have been stacked, thereby forming a multilayer chip having first and second side surfaces to which ends of the first and second electrode layers are exposed, the first and second side surfaces being perpendicular to a second axis orthogonal to the first axis; forming first and second side margin portions on the first and second side surfaces, respectively, of the multilayer chip, and firing an unfired ceramic body including the multilayer chip and the first and second side margin portions to obtain a ceramic body having a dimension in the direction of the first axis larger than a dimension in the direction of the second axis.

For example, the second electrode layer may have a higher content ratio of a ceramic material to a conductive material than the first electrode layer.

For example, each of the first and second electrode layers may contain ceramic powder, and an average particle size of the ceramic powder in the second electrode layer may be larger than that in the first electrode layer.

For example, the second electrode layer may be thicker in the direction of the first axis than the first electrode layer.

These configurations make the sinterability of the second electrode layer lower than the sinterability of the first electrode layer, and inhibits structural defects such as cracks in the peripheral portion in the direction of the first axis.

BRIEF DESCRIPTION OF THE DRAWINGS

FIG. 7B is a plan view of a second central ceramic sheet;

FIG. 8A is a plan view of a first peripheral ceramic sheet, and FIG. 8B is a plan view of a second peripheral ceramic sheet;

DETAILED DESCRIPTION

Figure 1:
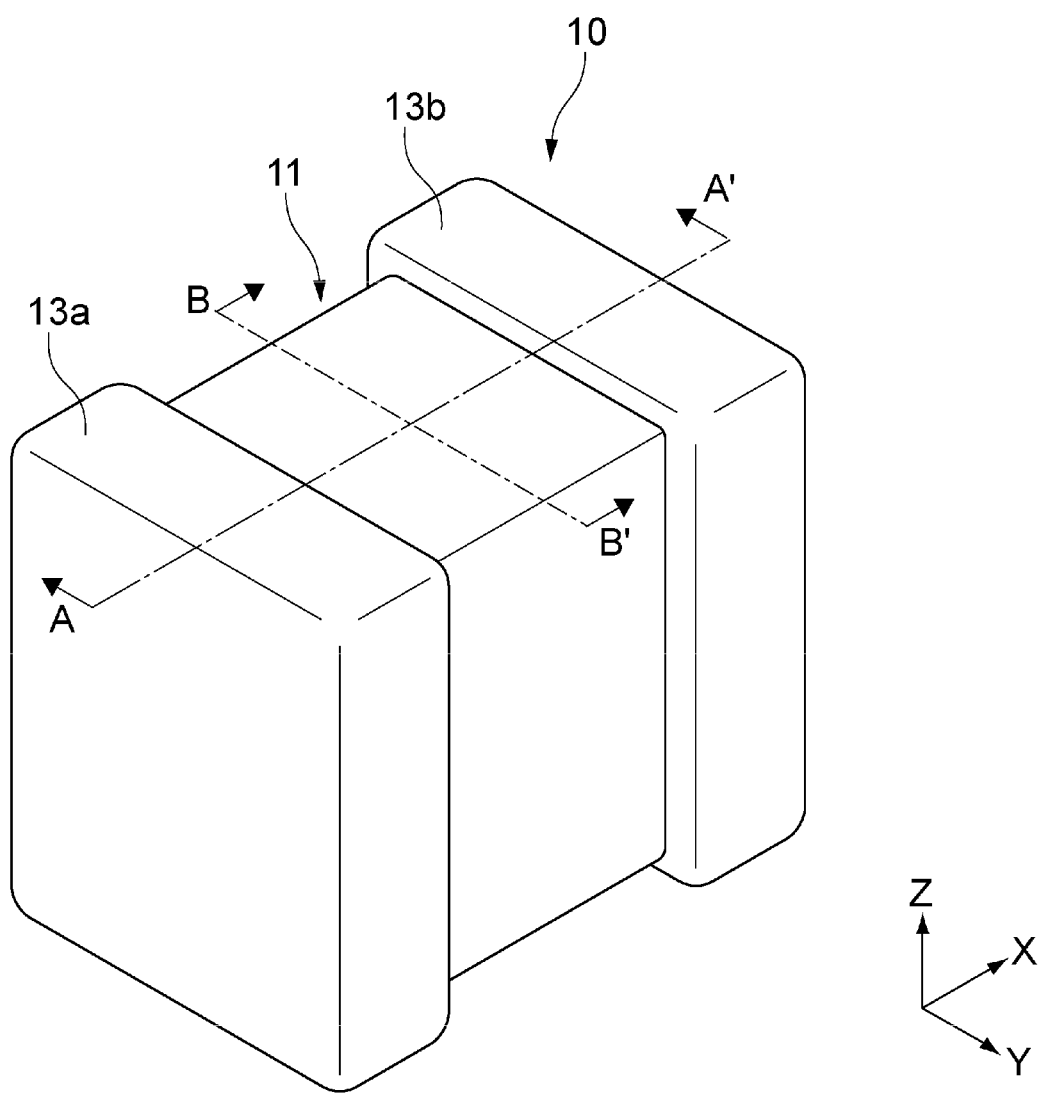
FIG. 1 is a perspective view of a multilayer ceramic capacitor in accordance with a first embodiment.

Hereinafter, embodiments will be described with reference to the drawings. In the drawings, an X-axis, a Y-axis, and a Z-axis that are orthogonal to each other are illustrated as appropriate. The X-axis, the Y-axis, and the Z-axis define a fixed coordinate system that is fixed with respect to a multilayer ceramic capacitor 10.

First Embodiment

Overall Structure of a Multilayer Ceramic Capacitor

Figure 2:
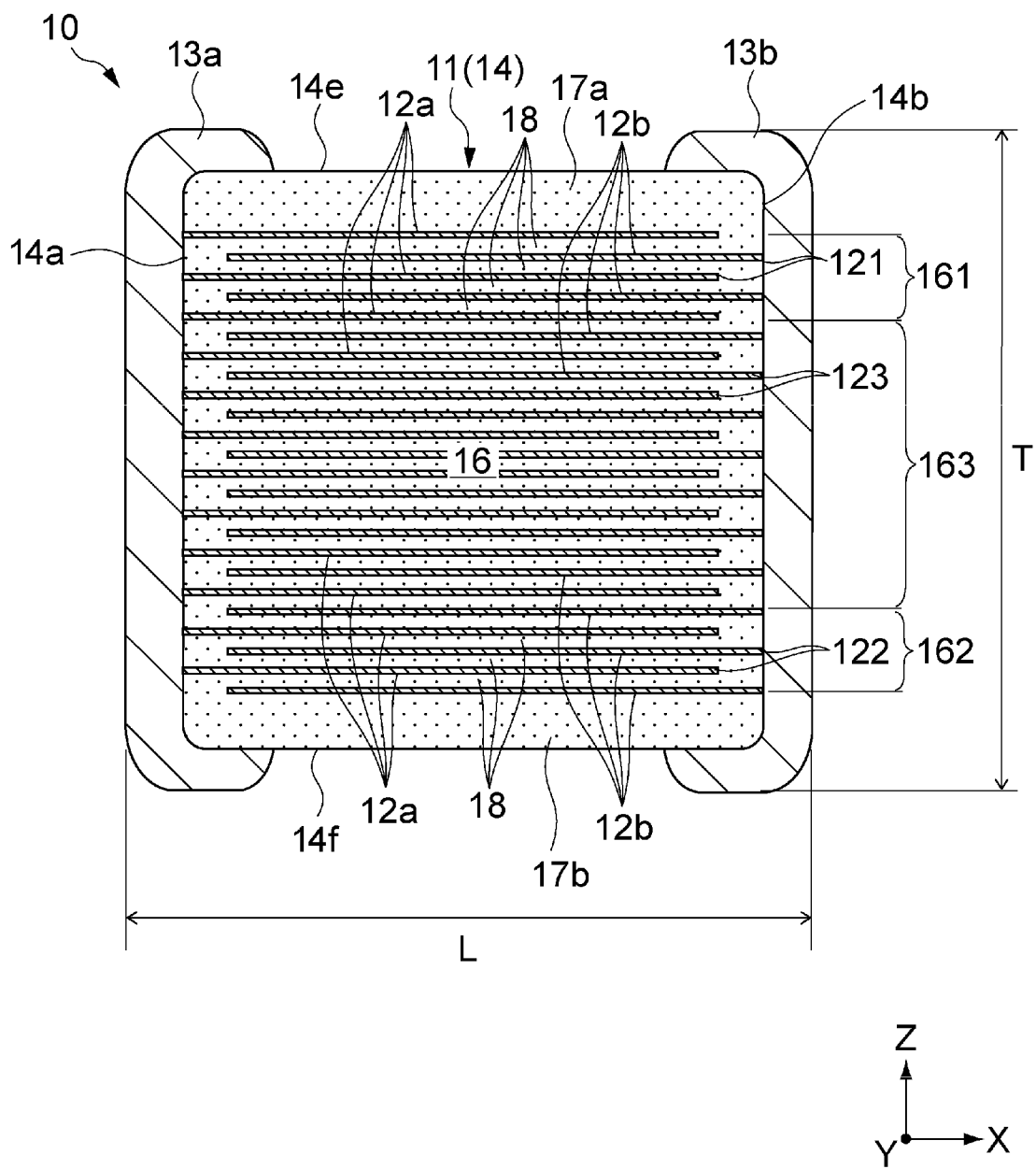
FIG. 2 is a cross-sectional view of the multilayer ceramic capacitor taken along line A-A' in FIG. 1.
Figure 3:
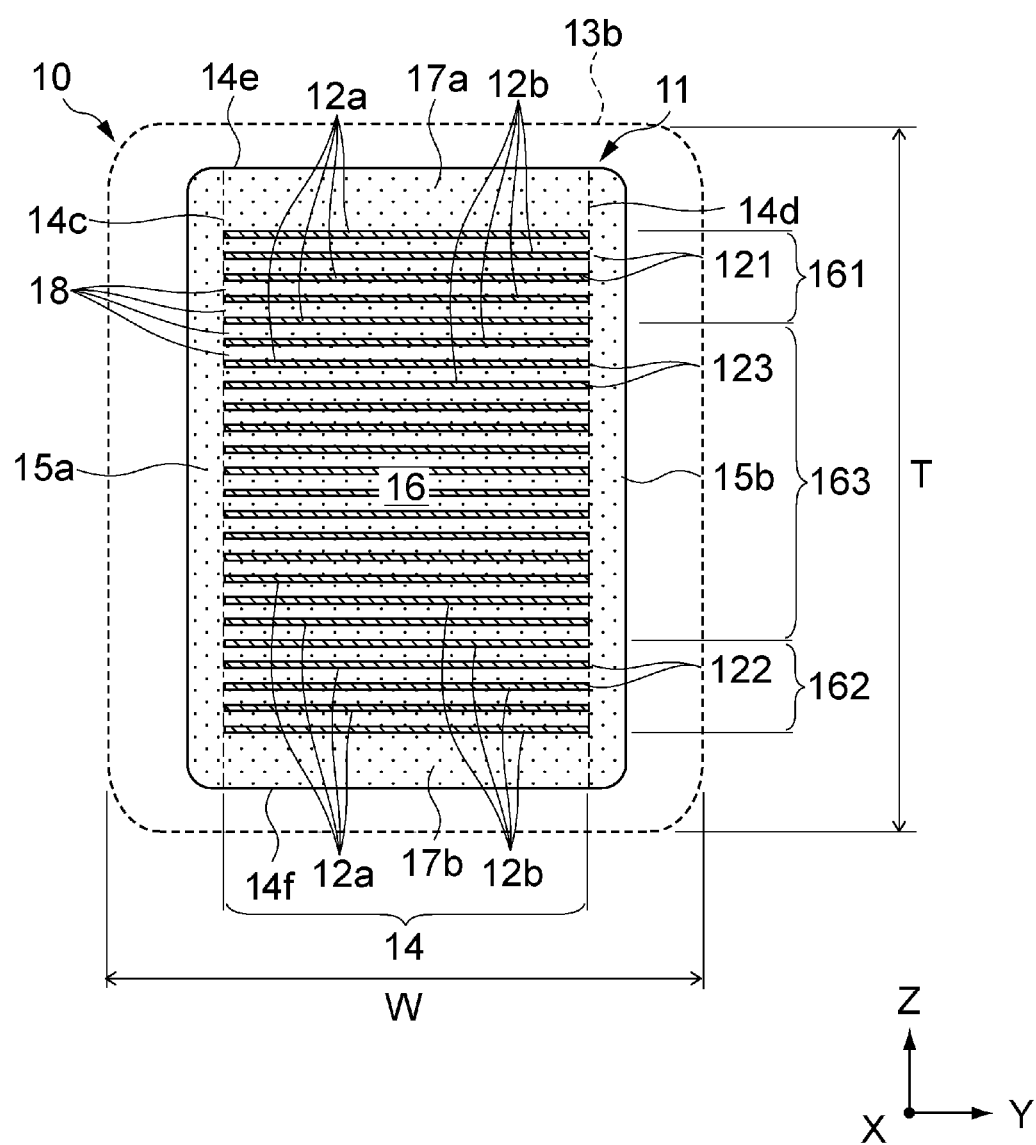
FIG. 3 is a cross-sectional view of the multilayer ceramic capacitor taken along line B-B' in FIG. 1.

FIG. 1 to FIG. 3 illustrate the multilayer ceramic capacitor 10 in accordance with an embodiment. FIG. 1 is a perspective view of the multilayer ceramic capacitor 10. FIG. 2 is a cross-sectional view of the multilayer ceramic capacitor 10 taken along line A-A' in FIG. 1. FIG. 3 is a cross-sectional view of the multilayer ceramic capacitor 10 taken along line B-B' in FIG. 1.

The multilayer ceramic capacitor 10 includes a ceramic body 11, a first external electrode 13a, and a second external electrode 13b. The ceramic body 11 is configured as a rectangular parallelepiped having a first end surface and a second end surface perpendicular to the X-axis, a first side surface and a second side surface perpendicular to the Y-axis, and a first principal surface and a second principal surface perpendicular to the Z-axis. The "rectangular parallelepiped" may be any shape as long as it is a substantially rectangular parallelepiped. For example, the ridge portions connecting the surfaces of the ceramic body 11 may be rounded.

The principal surfaces, the end surfaces, and the side surfaces of the ceramic body 11 are all flat surfaces. The flat surface in the present embodiment may not be necessarily strictly a flat surface as long as it is a surface recognized as being flat when viewed as a whole, and includes, for example, a surface having a minute uneven shape thereon, a surface having a gently curved shape within a predetermined range, and the like.

The multilayer ceramic capacitor 10 is configured as a high-height type in which the dimension T in the Z-axis direction of the ceramic body 11 is larger than the dimension W in the Y-axis direction. That is, the multilayer ceramic capacitor 10 can be mounted in a mounting space limited in the Y-axis direction while securing a large capacitance by increasing the dimension T of the ceramic body 11.

Specifically, the multilayer ceramic capacitor 10 has, for example, the following dimensions. The dimension L in the X-axis direction of the multilayer ceramic capacitor 10 is, for example, 0.2 mm or greater and 1.2 mm or less. The dimension W in the Y-axis direction of the multilayer ceramic capacitor 10 is, for example, 0.1 mm or greater and 0.7 mm or less. The dimension T in the Z-axis direction of the multilayer ceramic capacitor 10 is, for example, 0.15 mm or greater and 1.0 mm or less. The ratio of the dimension T to the dimension W of the multilayer ceramic capacitor 10 is, for example, 1.2 or greater and 2.0 or less. The ratio of the dimension T to the dimension L of the multilayer ceramic capacitor 10 is, for example, 0.6 or greater and 1.0 or less. The "dimension" in a certain direction of the multilayer ceramic capacitor 10 means the largest dimension in the certain direction.

In the following description, the term "at a central side in the Z-axis direction" refers to being closer to a virtual X-Y plane that divides the multilayer ceramic capacitor 10 into two equal parts in the Z-axis direction, and the term "at a peripheral side in the Z-axis direction" or the term "at an outer side in the Z-axis direction" refers to being farther from the virtual X-Y plane.

The external electrodes 13a and 13b are opposite to each other in the X-axis direction across the ceramic body 11, and cover the respective end surfaces of the ceramic body 11. For example, the external electrodes 13a and 13b illustrated in FIG. 1 extend from the respective end surfaces to the principal surfaces and the side surfaces of the ceramic body 11. The shape of the external electrodes 13a and 13b is not limited to the example illustrated in FIG. 1.

The external electrodes 13a and 13b contain a metal material as a main component. Examples of the metal material forming the external electrodes 13a and 13b include, but are not limited to, cupper (Cu), nickel (Ni), tin (Sn), palladium (Pd), platinum (Pt), silver (Ag), gold (Au), and alloys thereof. In the present embodiment, the main component refers to a component having the highest content ratio.

The ceramic body 11 includes a multilayer body 14, a first side margin portion 15a, and a second side margin portion 15b. The multilayer body 14 is configured as a rectangular parallelepiped having a first end surface 14a and a second end surface 14b perpendicular to the X-axis, a first side surface 14c and a second side surface 14d perpendicular to the Y-axis, and a first principal surface 14e and a second principal surface 14f perpendicular to the Z-axis.

The side margin portions 15a and 15b are opposite to each other in the Y-axis direction with the multilayer body 14 interposed therebetween. The side margin portions 15a and 15b cover the side surfaces 14c and 14d of the multilayer body 14, respectively.

The multilayer body 14 includes an electrode-stacked portion 16, a first cover portion 17a, and a second cover portion 17b. The cover portions 17a and 17b cover the electrode-stacked portion 16 from above and below the electrode-stacked portion 16 in the Z-axis direction and form a pair of the principal surfaces of the multilayer body 14.

The electrode-stacked portion 16 includes a plurality of ceramic layers 18 stacked in the Z-axis direction, and first internal electrodes 12a and second internal electrodes 12b disposed between the ceramic layers 18 and alternately led out to respective sides along the Y-axis. In the present embodiment, each of the ceramic layers 18 and the internal electrodes 12a and 12b has a sheet shape extending along the X-Y plane. The internal electrodes 12a and 12b are alternately arranged along the Z-axis direction. That is, the internal electrodes 12a and 12b face each other in the Z-axis direction with the ceramic layer 18 interposed therebetween.

The first internal electrodes 12a are led out to the first end surface 14a covered with the first external electrode 13a. On the other hand, the second internal electrodes 12b are led out to the second end surface 14b covered with the second external electrode 13b. That is, the internal electrodes 12a and 12b are alternately led out to the first and second end surfaces 14a and 14b. Thus, the first internal electrodes 12a are connected only to the first external electrode 13a, and the second internal electrodes 12b are connected only to the second external electrode 13b.

The internal electrodes 12a and 12b are formed across the entire width in the Y-axis direction of the electrode-stacked portion 16, and the ends of the internal electrodes 12a and 12b extend to the side surfaces 14c and 14d of the multilayer body 14. Since the side surfaces 14c and 14d of the multilayer body 14 are covered with the side margin portions 15a and 15b, respectively, it is possible to ensure insulation between the internal electrodes 12a and 12b on the side surfaces 14c and 14d of the multilayer body 14.

With such a configuration, in the multilayer ceramic capacitor 10, when a voltage is applied between the external electrodes 13a and 13b, the voltage is applied to the plurality of the ceramic layers 18 between the internal electrodes 12a and 12b. As a result, in the multilayer ceramic capacitor 10, electric charge corresponding to the voltage between the external electrodes 13a and 13b is stored.

The ceramic layers 18 contain a dielectric ceramic having a high dielectric constant as a main component in order to increase the capacitance of each ceramic layer 18 between the internal electrodes 12a and 12b. Examples of the dielectric ceramic having a high dielectric constant include, but are not limited to, a material having a perovskite structure containing barium (Ba) and titanium (Ti), typified by barium titanate ($BaTiO_3$).

The dielectric ceramic may be strontium titanate ($SrTiO_3$), calcium titanate ($CaTiO_3$), magnesium titanate ($MgTiO_3$), calcium zirconate ($CaZrO_3$), calcium zirconate titanate ($Ca(Ti, Zr)O_3$), barium calcium zirconate titanate (($Ba, Ca)(Ti, Zr)O_3$), barium zirconate ($BaZrO_3$), or titanium dioxide ($TiO_2$).

The side margin portions 15a and 15b and the cover portions 17a and 17b also contain an insulating ceramic as a main component, and preferably contain a dielectric ceramic having the same composition as that of the ceramic layer 18 as a main component. This configuration reduces the stress caused by the difference between the physical property of the electrode-stacked portion 16 and the physical property of its surroundings.

The thickness in the Z-axis direction of each ceramic layer 18 may be, for example, 0.1 µm or greater and 1.0 µm or less in order to increase the electrostatic capacitance while considering the particle size of the ceramic particles. The thickness of the ceramic layer 18 is an average value of the thicknesses measured at a plurality of locations of the ceramic layer 18. As an example, six layers are selected from the ceramic layers 18 in the field of view observed by the scanning electron microscope, and the thicknesses are measured at five equally spaced locations in each layer. Then, the average value of the obtained thicknesses at 30 locations is defined as the thickness of the ceramic layer 18.

The internal electrodes 12a and 12b contain a metal material as a main component. A typical example of the metal material is nickel (Ni), and other examples include copper (Cu), palladium (Pd), platinum (Pt), silver (Ag), gold (Au), and alloys thereof.

The thicknesses in the Z-axis direction of the internal electrodes 12a and 12b can be set to, for example, 0.1 µm or greater and 1.0 µm or less to increase the continuity of the internal electrodes 12a and 12b and to increase the capacitance by increasing the number of the internal electrodes 12a and 12b in the electrode-stacked portion 16. The thicknesses of the internal electrodes 12a and 12b are average values of the thicknesses measured at a plurality of locations of the internal electrodes 12a and 12b. As an example, six layers are selected from the internal electrodes 12a and 12b in the field of view observed by the scanning electron microscope, and the thicknesses are measured at five equally spaced locations in each layer. Then, the average value of the obtained thicknesses at 30 locations is defined as the thicknesses of the internal electrodes 12a and 12b.

The ceramic body 11 is formed as a sintered body of dielectric ceramic. On the other hand, since the internal electrodes 12a and 12b included in the electrode-stacked portion 16 contain a metal material, they have a sintering behavior different from that of the dielectric ceramic. Specifically, the internal electrodes 12a and 12b have a lower sintering temperature than the dielectric ceramic, and the sintering proceeds faster. Because of the difference between these sintering behaviors, a conventional multilayer ceramic capacitor has the following problems.

Figure 4:
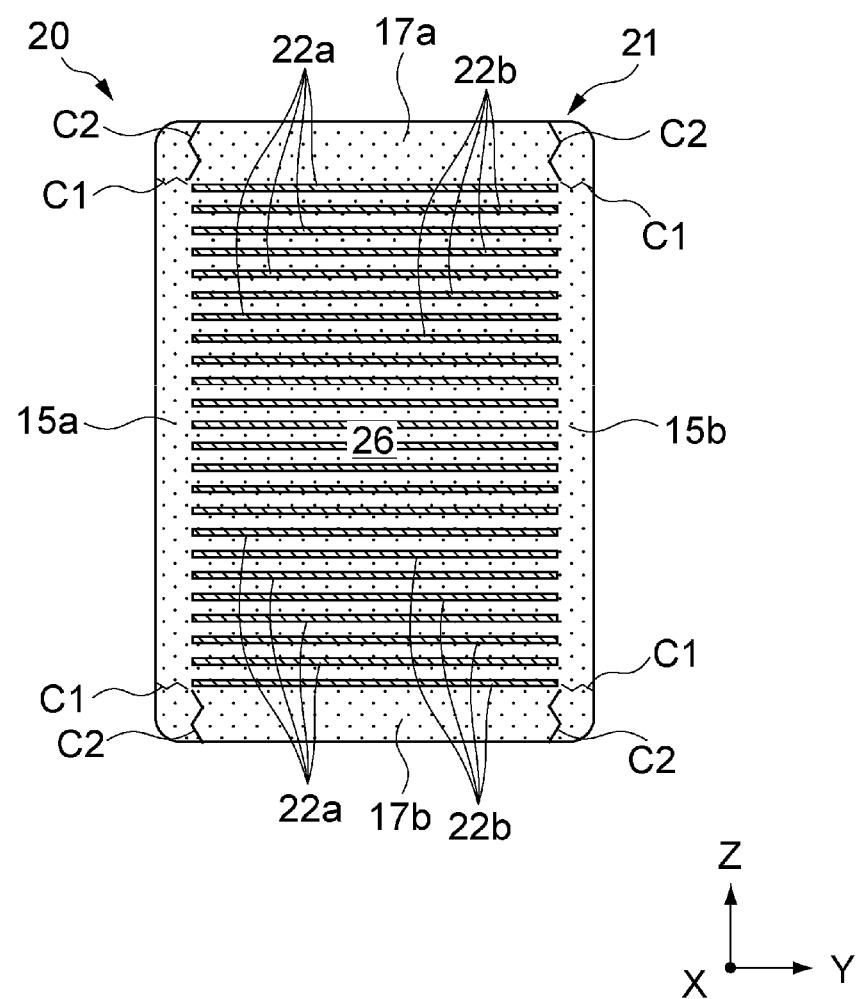
FIG. 4 is a cross-sectional view of the multilayer ceramic capacitor in accordance with a comparative example of the first embodiment, illustrating a cross section at the same position as in FIG. 3.

FIG. 4 is a cross-sectional view of a conventional multilayer ceramic capacitor 20, illustrating a cross section at the same position as in FIG. 3. In the multilayer ceramic capacitor 20, internal electrodes 22a and 22b have substantially the same configuration and the same sinterability in an entire electrode-stacked portion 26 of a ceramic body 21.

For example, in the step of sintering the ceramic body 21, since the sintering temperature is set in accordance with the dielectric ceramic, the internal electrodes 22a and 22b are likely to be excessively sintered. This may cause deformation of the internal electrodes 22a and 22b such as discontinuity and spheroidization. Further, the thinning of the internal electrodes 22a and 22b increases the possibility of such deformation.

Furthermore, in the case that the ceramic body 21 is of a high-height type, the number of the stacked internal electrodes 22a and 22b is large, and thus distortion is likely to occur in the entire ceramic body 21 because of deformation of the internal electrodes 22a and 22b. This distortion tends to be significant in the peripheral portions in the Z-axis direction, which is the stacking direction of the internal electrodes 22a and 22b. Thus, stresses are likely to be generated in the cover portions 17a and 17b and the side margin portions 15a and 15b that cover the peripheral portions in the Z-axis direction of the electrode-stacked portion 26.

The internal electrodes 12a and 12b have a lower sintering temperature than the dielectric ceramic, and a lower temperature at which contraction due to sintering starts than the dielectric ceramic. That is, in the sintering step, the electrode-stacked portion 26 starts to contract earlier than the cover portions 17a and 17b and the side margin portions 15a and 15b surrounding the electrode-stacked portion 26.

Furthermore, in the case that the ceramic body 21 is of a high-height type, the difference in the amount of contraction in the Z-axis direction, which is the stacking direction of the electrode-stacked portion 26, is likely to be large. As a result, stress caused by the difference in the amount of contraction tends to concentrate between the peripheral portions in the Z-axis direction of the electrode-stacked portion 26 and the cover portions 17a and 17b that cover the peripheral portions and between the peripheral portions in the Z-axis direction of the electrode-stacked portion 26 and the side margin portions 15a and 15b that cover the peripheral portions.

As a result, as illustrated in FIG. 4, in the conventional high-height multilayer ceramic capacitor 20, cracks C1 and C2 due to the stress are likely to be generated in the vicinity of the boundary between the electrode-stacked portion 26 and the cover portions 17a and 17b and in the vicinity of the boundary between the electrode-stacked portion 26 and the side margin portions 15a and 15b.

For example, the crack C1 illustrated in FIG. 4 may be generated when the cover portions 17a and 17b cannot follow the contraction in the Z-axis direction of the electrode-stacked portion 26 and the stress between the cover portions 17a and 17b and the electrode-stacked portion 26 become large in the sintering step.

In addition, for example, the crack C2 illustrated in FIG. 4 may be generated when the difference between the amount of contraction in the Z-axis direction of the electrode-stacked portion 26 and the amount of contraction in the Z-axis direction of the side margin portions 15a and 15b increases, and the stress between the side margin portions 15a and 15b and the electrode-stacked portion 26 thereby increases in the sintering step. Further, as illustrated in a manufacturing method described later, when a method of attaching the side margin portions 15a and 15b later is adopted, the boundary portions between the multilayer body of the electrode-stacked portion 26 and the cover portions 17a and 17b and the side margin portions 15a and 15b are easily peeled off, and the crack C2 is particularly likely to be generated.

In contrast, in the multilayer ceramic capacitor 10 of the present embodiment illustrated in FIG. 1 to FIG. 3, the cracks C1 and C2 can be inhibited from being generated by adjusting the sinterability of the internal electrodes 12b and 12a disposed at the side of the cover portions 17b and 17b of the electrode-stacked portion 16 and the sinterability of the internal electrodes 12a and 12b disposed at the side of the center in the Z-axis direction of the electrode-stacked portion 16 to be different. Hereinafter, a detailed configuration of the electrode-stacked portion 16 of the present embodiment will be described.

As illustrated in FIG. 3, the internal electrodes 12a and 12b include a plurality of first peripheral internal electrodes 121, a plurality of second peripheral internal electrodes 122, and a plurality of central internal electrodes 123. The peripheral internal electrodes 121 and 122 are internal electrodes having lower sinterability than the central internal electrodes 123.

The first peripheral internal electrodes 121 are collectively disposed in the peripheral portion in the Z-axis direction at the side of the first cover portion 17a. The second peripheral internal electrodes 122 are collectively disposed in the peripheral portion in the Z-axis direction at the side of the second cover portion 17b. The central internal electrodes 123 are collectively disposed closer to the center in the Z-axis direction than the peripheral internal electrodes 121 and 122. The plurality of the internal electrodes being "disposed collectively" means that the plurality of the internal electrodes are successively disposed in the Z-axis direction with the ceramic layers 18 interposed therebetween. Specifically, the peripheral internal electrodes 121 and 122 include outermost internal electrodes in the Z-axis direction and a plurality of internal electrodes arranged successively from the outermost internal electrodes with the ceramic layers 18 interposed therebetween.

The electrode-stacked portion 16 is divided along the Z-axis direction into a first peripheral section 161 where the first peripheral internal electrodes 121 are disposed, a central section 163 where the central internal electrodes 123 are disposed, and a second peripheral section 162 where the second peripheral internal electrodes 122 are disposed. When the dimension in the Z-axis direction of the entire electrode-stacked portion 16 is defined as 100%, the lower limit of the ratio of the dimension in the Z-axis direction of each of the peripheral sections 161 and 162 is, for example, 10% or greater, more preferably 15% or greater, and the upper limit of the ratio is, for example, 30% or less, more preferably 25% or less. When the dimension in the Z-axis direction of the entire electrode-stacked portion 16 is defined as 100%, the lower limit of the ratio of the dimension in the Z-axis direction of the central section 163 is, for example, 40% or greater, more preferably 50% or greater, and the upper limit of the ratio is, for example, 80% or less, more preferably 70% or less.

The first peripheral section 161 is a section from the outermost first peripheral internal electrode 121 in the Z-axis direction to the first peripheral internal electrode 121 closest to the center in the Z-axis direction. Similarly, the second peripheral section 162 is a section from the outermost second peripheral internal electrode 122 in the Z-axis direction to the second peripheral internal electrode 122 closest to the center in the Z-axis direction. The central section 163 is a section excluding the peripheral sections 161 and 162 in the electrode-stacked portion 16.

In the present embodiment, the sinterability of the peripheral internal electrodes 121 and 122 and the sinterability of the central internal electrodes 123 are controlled by the content ratio of the ceramic particles. The ceramic particles are crystal particles formed of dielectric ceramic added as a material of the internal electrodes. When the ceramic particles are contained in the internal electrodes, the composition of the internal electrodes approaches the composition of the ceramic layers 18, the cover portions 17a and 17b, and the side margin portions 15a and 15b. As a result, the sintering behavior of the internal electrodes can be brought close to the sintering behavior of the ceramic layers 18, the cover portions 17a and 17b, and the side margin portions 15a and 15b, so that the sintering of the internal electrodes can be delayed and excessive sintering and rapid contraction can be inhibited.

Figure 5A:
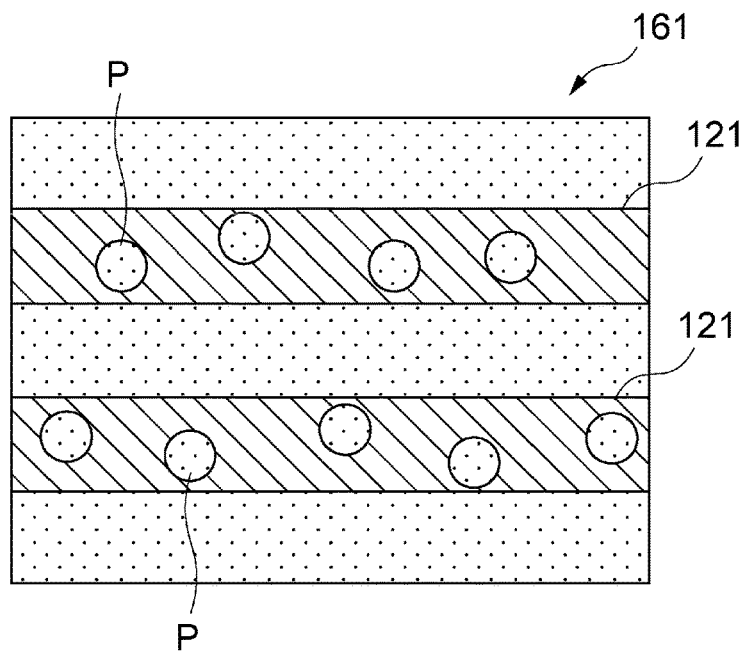
FIG. 5A and FIG. 5B are enlarged views of FIG. 3, FIG. 5A schematically illustrates a part of a first peripheral section of the multilayer ceramic capacitor in accordance with the first embodiment, and FIG. 5B schematically illustrates a part of a central section of the multilayer ceramic capacitor.
Figure 5B:
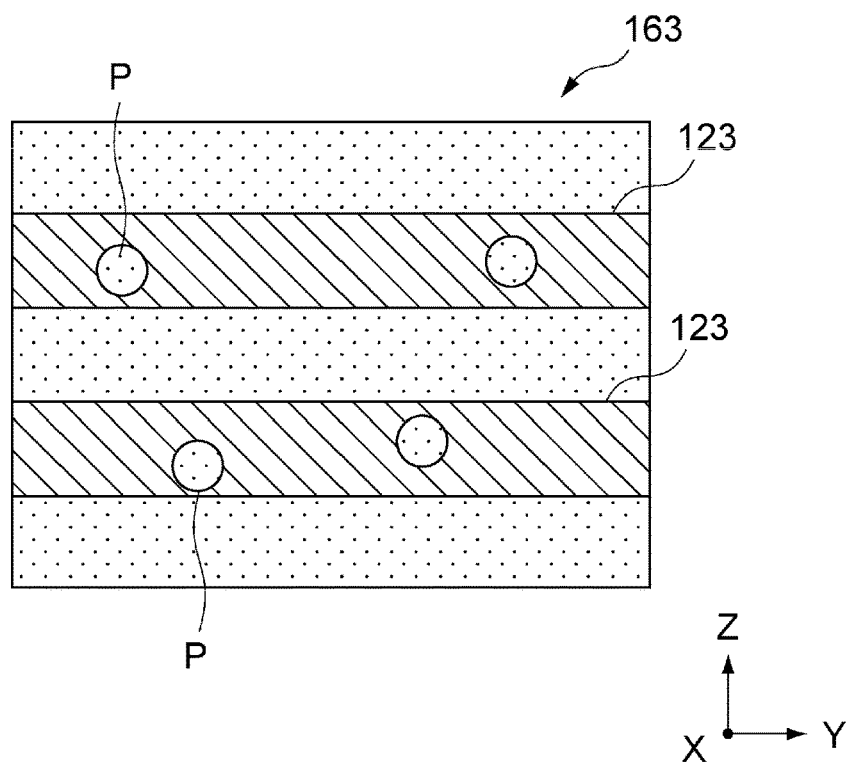

FIG. 5A and FIG. 5B are enlarged views of FIG. 3, FIG. 5A schematically illustrates a part of the first peripheral section 161, and FIG. 5B schematically illustrates a part of the central section 163. The second peripheral section 162 is configured in the same manner as the first peripheral section 161, and thus is not illustrated.

As illustrated in FIG. 5A and FIG. 5B, in the present embodiment, the content ratio of the ceramic particles P in each of the peripheral internal electrodes 121 and 122 is greater than that in each of the central internal electrodes 123. As a result, excessive sintering of the peripheral internal electrodes 121 and 122 located at the outer side, of which the sintering particularly proceeds faster, can be inhibited, and spheroidization and discontinuity of the peripheral internal electrodes 121 and 122 can be inhibited. Therefore, distortion of the ceramic body 11 caused by the spheroidization and discontinuity of the peripheral internal electrodes 121 and 122 is eliminated, and stresses generated in the cover portions 17a and 17b and the side margin portions 18a and 18b that cover the peripheral sections 161 and 162 can be reduced.

Since the peripheral internal electrodes 121 and 122 contains more ceramic particles P than the central internal electrodes 123, rapid contraction of the peripheral sections 161 and 162 can be suppressed in the firing step. Therefore, it is possible to reduce the stresses generated in the vicinities of the boundary portions between the peripheral sections 161 and 162 and the cover portions 17a and 17b and the boundary portions between the peripheral sections 161 and 162 and the side margin portions 15a and 15b.

Because of these stress reduction effects, it is possible to effectively inhibit cracks in the vicinities of the boundary portions between the peripheral sections 161 and 162 and the cover portions 17a and 17b and in the vicinity of the boundary portions between the peripheral sections 161 and 162 and the side margin portions 15a and 15b, which are particularly likely to be generated in the high-height multilayer ceramic capacitor 10.

In addition, the inventors have found that, in the high-height multilayer ceramic capacitor 10, the effect of inhibiting cracks is higher when the amount of the ceramic particles P added to each of the peripheral internal electrodes 121 and 122 is increased more than the amount of the ceramic particles P added to the central internal electrodes 123 than when the amounts of the ceramic particles P added to all the internal electrodes 12a and 12b are uniformly increased as described in the examples described later. The reason may be considered as follows.

In the sintering process, the ceramic body 11 contracts toward the central portion of the electrode-stacked portion 16, which has a low contraction starting temperature. On the other hand, the peripheral portions of the cover portions 17a and 17b and the side margin portions 15a and 15b in the Z-axis direction are relatively unlikely to contract because they are distant from the central portion. Therefore, the ceramic body 11 in the contraction process is likely to be distorted into a shape in which the corner portions located in the peripheral portions in the Z-axis direction protrude outward. In the present embodiment, the amount of the ceramic particles P added to each of the peripheral internal electrodes 121 and 122 is increased more than the amount of the ceramic particles P added to each of the central internal electrodes 123, so that the contraction of the peripheral internal electrodes 121 and 122 is moderated and the distortion of the peripheral portions in the Z-axis direction is also reduced. In other words, the peripheral internal electrodes 121 and 122 act like a buffer layer that buffers distortion caused by firing between the central internal electrodes 123 and the peripheral portions of the ceramic body 11 in the Z-axis direction, thereby inhibiting cracks caused by the distortion.

Further, if the amounts of the ceramic particles P added to the respective internal electrodes 12a and 12b are uniformly increased in order to sufficiently obtain the effect of inhibiting sintering of the electrode-stacked portion 16, the ceramic particles P easily grow in the internal electrodes 12a and 12b, and the risk of a decrease in the continuity of the internal electrodes 12a and 12b increases. When the continuity is reduced in many of the internal electrodes 12a and 12b, distortion of the multilayer ceramic capacitor 10 is likely to occur, and there is a concern about a reduction in capacitance.

Therefore, in the present embodiment, the sinterability of the peripheral internal electrodes 121 and 122 located in the peripheral portions in the Z-axis direction of the electrode-stacked portion 16 is reduced with respect to the sinterability of the central internal electrode 123, thereby inhibiting a reduction in capacitance and effectively inhibiting cracks in the high-height ceramic body 11.

The content ratio of the ceramic particles P in the internal electrode can be measured, for example, as follows. First, a cross section parallel to the Y-Z plane of the multilayer ceramic capacitor is cut out. This cross section is a cross section of the central portion of the multilayer ceramic capacitor in the X-axis direction. Then, using a scanning electron microscope or a transmission electron microscope, a cross section of each section of the electrode-stack portion is imaged at a magnification at which about 5 to 10 internal electrodes are included in a visual field. From the captured image, the ratio of the area of the ceramic particles to the area of the internal electrode is calculated.

A method for evaluating the content ratio of the ceramic particles in each section will be described. For example, for five to ten internal electrodes in the vicinity of the outermost layer in the Z-axis direction of the electrode-stacked portion 16, the average value of the ratios of the area of the ceramic particles to the area of the internal electrode in the field of view is calculated, and this average value is defined as the content ratio of the ceramic particles in the peripheral internal electrode. Similarly, for five to ten internal electrodes in the central portion in the Z-axis direction of the electrode-stacked portion, the average value of the ratio of the area of the ceramic particles to the area of the internal electrode in the field of view is calculated, and this average value is defined as the content ratio of the ceramic particles in the central internal electrode. The calculated content ratio of the ceramic particles in the peripheral internal electrode and the calculated content ratio of the ceramic particles in the central internal electrode are compared with each other to determine whether the content ratio of the ceramic particles in the peripheral internal electrode is larger.

The content ratio of the ceramic particles P in the peripheral internal electrodes 121 and 122 is, for example, 5% or greater and 25% or less. The content ratio of the ceramic particles P in the central internal electrode 123 is, for example, 0% or greater and 20% or less. The ratio of the content ratio of the ceramic particles P in each of the peripheral internal electrodes 121 and 122 to the content ratio of the ceramic particles P in the central internal electrode 123 is, for example, 1.2 or greater and 5 or less.

Figure 6:
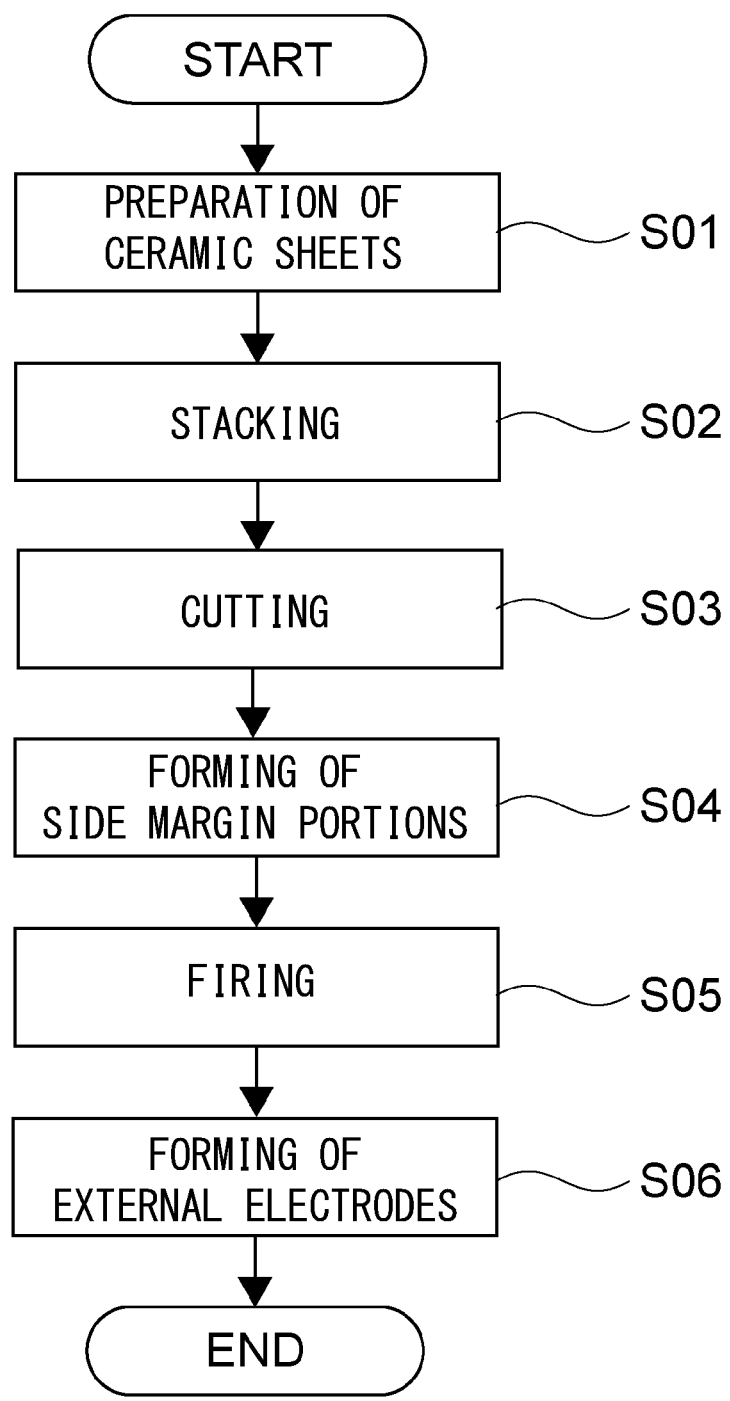
FIG. 6 is a flowchart illustrating a method of manufacturing the multilayer ceramic capacitor.

In order to adjust the content ratio of the ceramic particles P in each of the peripheral internal electrodes 121 and 122 to be larger, the amount of the ceramic particles P to be added to the material of each of the peripheral internal electrodes 121 and 122 is adjusted to be larger. Hereinafter, a method of manufacturing the multilayer ceramic capacitor 10 will be described. Manufacturing Method of the Multilayer Ceramic Capacitor FIG. 7A to FIG. 11 are views illustrating a manufacturing process of the multilayer ceramic capacitor 10. Hereinafter, a method of manufacturing the multilayer ceramic capacitor 10 will be described along FIG. 6 with reference to FIG. 7A to FIG. 11 as appropriate.

(Step S01: Preparation of Ceramic Sheets)

In step S01, central ceramic sheets 101 for forming the central internal electrodes 123, peripheral ceramic sheets 102 for forming the peripheral internal electrodes 121 and 122, and cover ceramic sheets 103 for forming the first and second cover portions 17a and 17b are prepared. In the following description, these three types of ceramic sheets are also referred to as the "ceramic sheet 101", the "ceramic sheet 102", and the "ceramic sheet 103". The ceramic sheets 101, 102, and 103 are configured as large sheets having regions corresponding to a plurality of chips.

The ceramic sheets 101, 102, and 103 illustrated in FIG. 7A and FIG. 7B and FIG. 8A and FIG. 8B are formed as unfired ceramic green sheets. Materials for the ceramic sheets 101, 102, and 103 are mixed to obtain a slurry. The materials include dielectric ceramic powder, binder resin, and organic solvent. A slurry obtained by mixing these materials with a ball mill or the like is formed into a sheet using a roll coater, a doctor blade, or the like. The thicknesses of the ceramic sheets 101 and 102 are adjusted in accordance with the thickness of the ceramic layer 18 after firing. The thickness of the ceramic sheet 103 is appropriately adjusted in accordance with the thicknesses of the cover portions 17a and 17b after firing.

Figure 9:
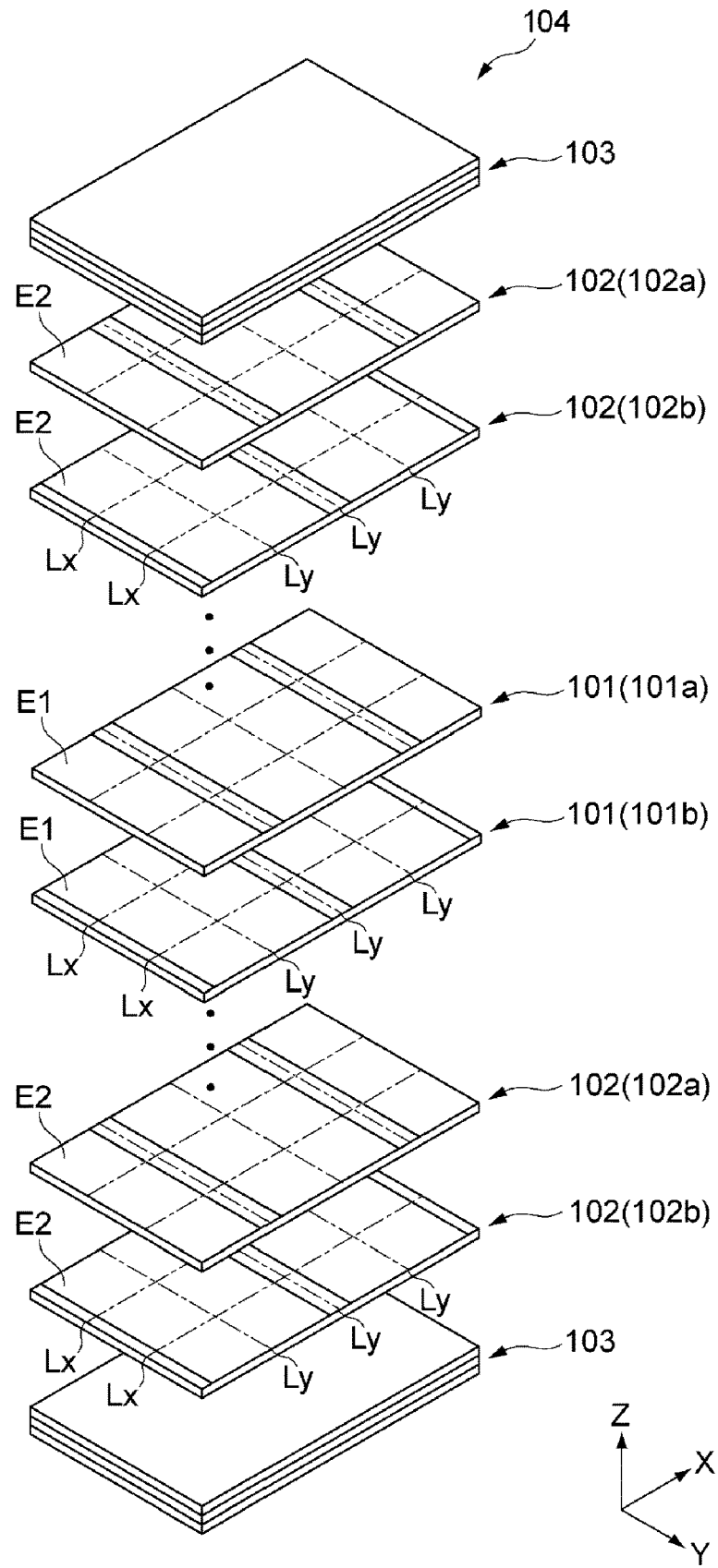
FIG. 9 is a perspective view of a multilayer sheet in the manufacturing process of the multilayer ceramic capacitor.

Unfired first electrode layers E1 corresponding to the central internal electrodes 123 are formed on the central ceramic sheet 101. Unfired second electrode layers E2 corresponding to the peripheral internal electrodes 121 and 122 are formed on the peripheral ceramic sheet 102. Referring to FIG. 9, no electrode layer is formed on the cover ceramic sheet 103.

In the present embodiment, the electrode layers E1 and E2 are formed of conductive pastes. The conductive paste basically contains conductive powder as a conductive material, binder resin, organic solvent, and the like. The conductive powder is composed of nickel (Ni), copper (Cu), palladium (Pd), platinum (Pt), silver (Ag), gold (Au), a mixture thereof, an alloy thereof, or the like. Furthermore, the conductive paste may contain a ceramic material. The ceramic material is, for example, ceramic powder that is powder of dielectric ceramic.

In the present embodiment, the content ratio of the ceramic material to the conductor powder (the conductive material) in the second electrode layer E2 is higher than that in the first electrode layer E1. Thus, in the firing step described later, the sinterability of the second electrode layer E2 is lower than that of the first electrode layer E1, and the sintering of the second electrode layer E2 can be delayed more than that of the first electrode layer E1.

For example, the content ratio of the ceramic material to the conductive material in the second electrode layer E2 is 5 mass % or greater and 25 mass % or less. The difference between the content ratio of the ceramic material to the conductive material of the second electrode layer E2 and the content ratio of the ceramic material to the conductive material of the first electrode layer E1 is, for example, 5 mass % or greater and 25 mass % or less. In the present embodiment, the first electrode layer E1 may not necessarily contain a ceramic material.

These conductive pastes are printed on the respective ceramic sheets 101 and 102 in patterns illustrated in FIG. 7A and FIG. 7B and FIG. 8A and FIG. 8B by screen printing, gravure printing, or the like. Through this process, the first and second electrode layers E1 and E2 are formed.

In the ceramic sheets 101 and 102, each of the electrode layers E1 and E2 has a plurality of strip-shaped patterns extending across a cutting line Lx parallel to the X-axis direction and along a cutting line Ly parallel to the Y-axis direction. The cutting lines Lx and Ly are virtual lines for separating a multilayer sheet into individual chips in a cutting step described later.

Further, ceramic sheets having two types of electrode-layer patterns corresponding to the internal electrodes 12a and 12b are also prepared in each of the ceramic sheets 101 and 102.

Figure 7A:
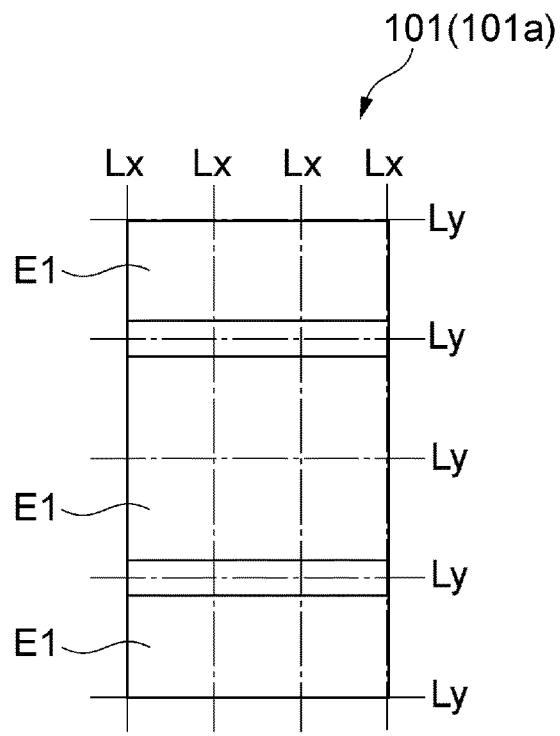
FIG. 7A and FIG. 7B are plan views illustrating a manufacturing process of the multilayer ceramic capacitor, FIG. 7A a is a plan view of a first central ceramic sheet.
Figure 7B:
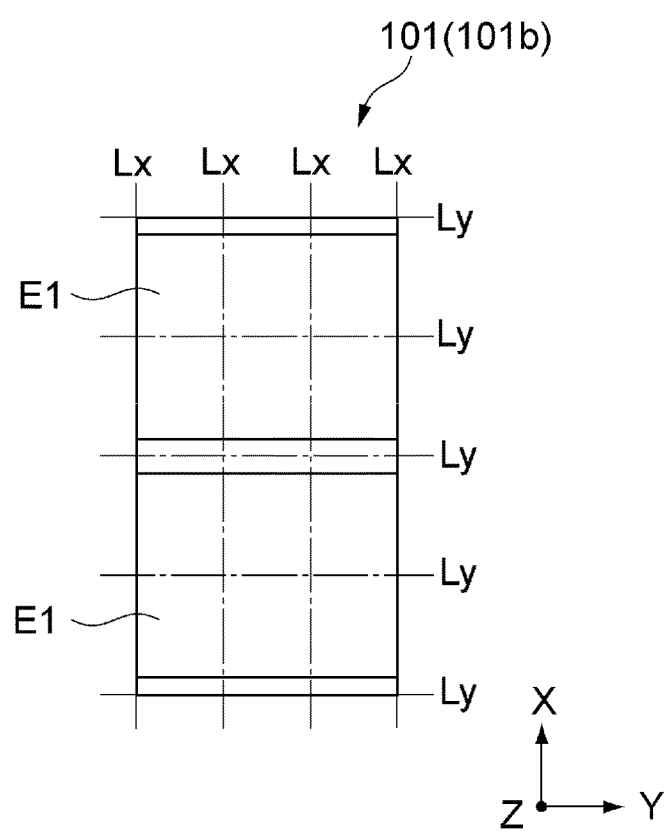

To be more specific, as illustrated in FIG. 7A and FIG. 7B, first and second central ceramic sheets 101a and 101b between which the pattern of the first electrode layer E1 is shifted by one chip in the X-axis direction are prepared as the central ceramic sheets 101. Similarly, as illustrated in FIG. 8A and FIG. 8B, first and second peripheral ceramic sheets 102a and 102b between which the pattern of the second electrode layer E2 is shifted by one chip in the X-axis direction are prepared as the peripheral ceramic sheets 102.

Figure 8A:
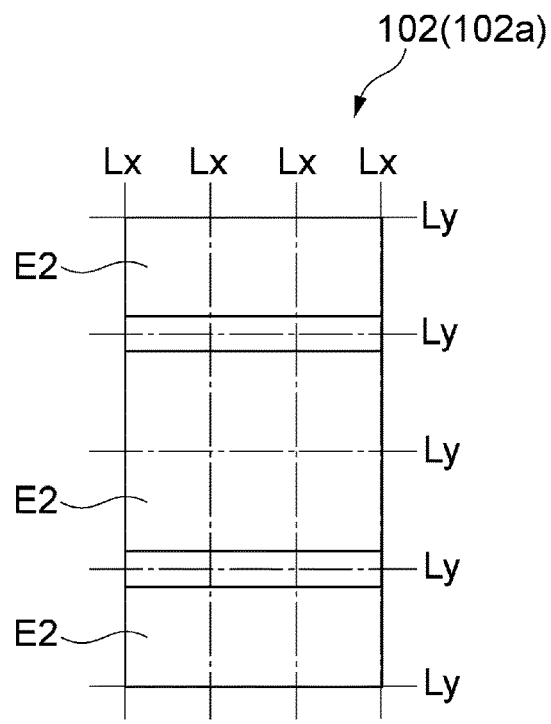
FIG. 8A and FIG. 8B are plan views illustrating the manufacturing process of the multilayer ceramic capacitor.
Figure 8B:
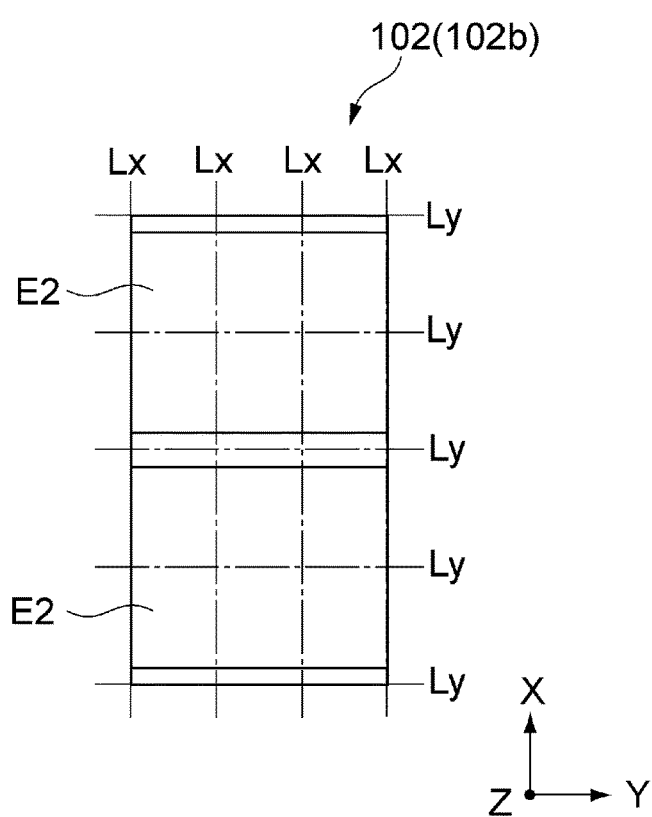

As illustrated in FIG. 7A and FIG. 8A, the patterns of the first electrode layers E1 of the first central ceramic sheet 101a and the patterns of the second electrode layers E2 of the first peripheral ceramic sheet 102a are the same, and correspond to the first internal electrodes 12a. As illustrated in FIG. 7B and FIG. 8B, the patterns of the first electrode layers E1 of the second central ceramic sheet 101b and the patterns of the second electrode layers E2 of the second peripheral ceramic sheet 102b are the same and correspond to the second internal electrodes 12b.

(Step S02: Stacking)

In step S02, the central ceramic sheets 101, the peripheral ceramic sheets 102, and the cover ceramic sheets 103 that have been prepared are stacked to form a large-sized multilayer sheet 104.

As illustrated in FIG. 9, in the multilayer sheet 104, the central ceramic sheets 101 are stacked in the Z-axis direction. Furthermore, the peripheral ceramic sheets 102 are stacked on both sides (upper and lower sides) of the stacked central ceramic sheets 101 in the Z-axis direction. Furthermore, the cover ceramic sheets 103 are stacked on both sides (upper and lower sides) of the stacked peripheral ceramic sheets 102 in the Z-axis direction. The multilayer body of the central ceramic sheets 101 corresponds to the central section 163 of the electrode-stacked portion 16. The multilayer bodies of the peripheral ceramic sheets 102 correspond to the peripheral sections 161 and 162 of the electrode-stacked portion 16. The multilayer bodies of the cover ceramic sheets 103 correspond to the cover portions 17a and 17b.

More specifically, in the multilayer body of the central ceramic sheets 101, the first central ceramic sheets 101a and the second central ceramic sheets 101b are alternately stacked. Similarly, in the multilayer body of the peripheral ceramic sheets 102, the first peripheral ceramic sheets 102a and the second peripheral ceramic sheets 102b are alternately stacked.

Note that, in practice, the ceramic sheets 101, 102, and 103 may be stacked in this order from the lower side of the multilayer sheet 104 in the Z-axis direction. In addition, pressure bonding may be performed from the Z-axis direction at the time of stacking the ceramic sheets 101, 102, and 103 and/or after stacking all the ceramic sheets 101, 102, and 103.

The numbers of the ceramic sheets 101, 102, and 103 to be stacked are appropriately adjusted in consideration of the dimension in the Z-axis direction of each section after firing. In the present embodiment, for example, the number of the stacked ceramic sheets 101 and 102 corresponding to the electrode-stacked portion 16 is 200 or greater and 1000 or less. When the total number of the stacked ceramic sheets 101 and 102 is defined as 100%, the lower limit of the ratio of the number of the peripheral ceramic sheets 102 stacked on one of the upper and lower sides in the Z-axis direction is, for example, 10% or greater, more preferably 15% or greater, and the upper limit of the ratio is, for example, 30% or less, more preferably 25% or less. That is, the number of the stacked peripheral ceramic sheets 102 referred to herein is the number of the stacked peripheral ceramic sheets 102 corresponding to one of the first peripheral section 161 and the second peripheral section 162. When the total number of the stacked ceramic sheets 101 and 102 is defined as 100%, the lower limit of the ratio of the number of the stacked central ceramic sheets 101 is, for example, 40% or greater, more preferably 50% or greater, and the upper limit of the ratio is, for example, 70% or less, more preferably 80% or less.

(Step S03: Cutting)

In step S03, the multilayer sheet 104 of FIG. 9 is cut along the cutting lines Lx and Ly. This separates the multilayer sheet 104 into pieces to form multilayer chips 114. For example, a press-cutting blade or a rotary blade can be used to cut the multilayer sheet 104.

Figure 10:
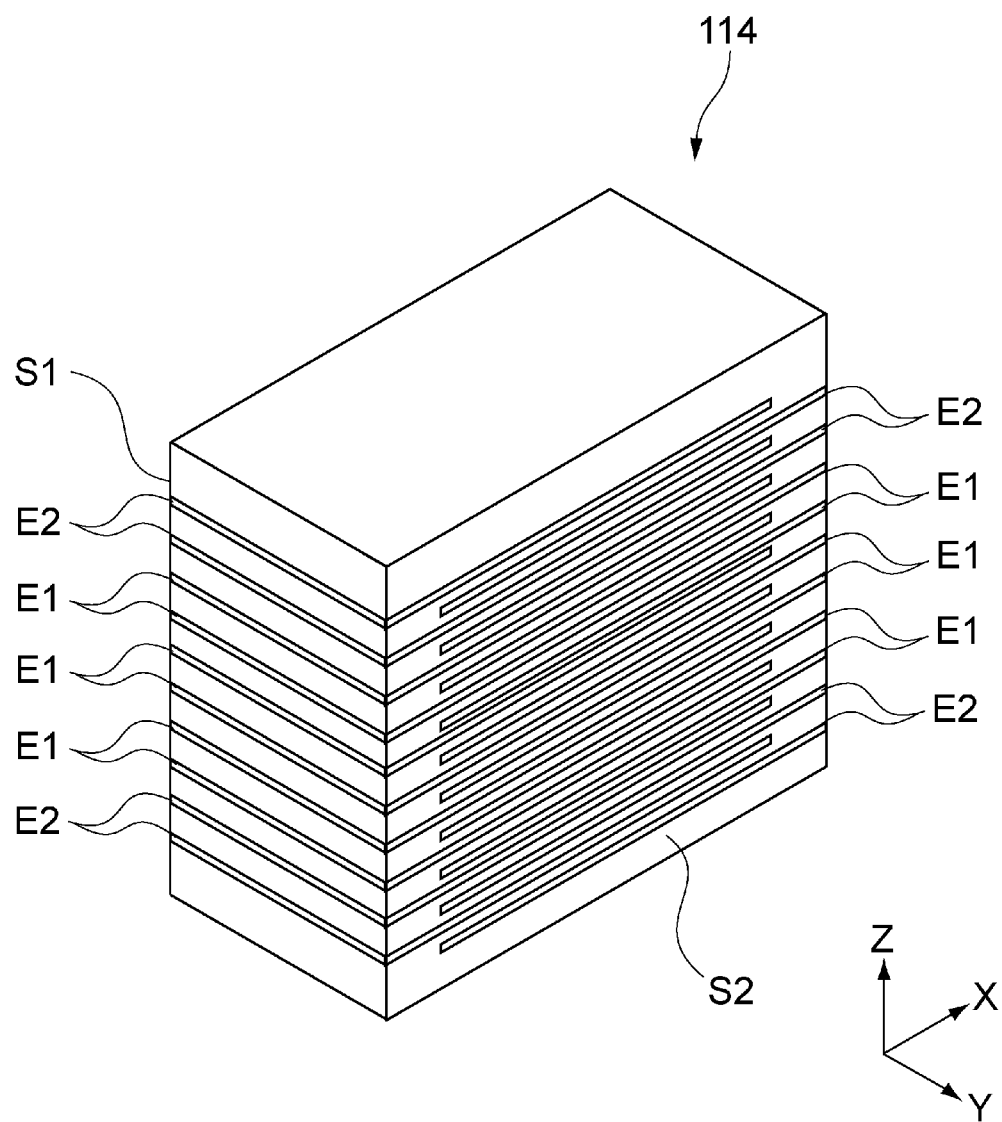
FIG. 10 is a perspective view of a multilayer chip in the manufacturing process of the multilayer ceramic capacitor.

FIG. 10 is a perspective view illustrating the multilayer chip 114. Note that the number of the electrode layers E1 and E2 illustrated in FIG. 10 is schematically illustrated and is different from that in FIG. 1 to FIG. 3.

As illustrated in FIG. 10, the multilayer chip 114 has first and second side surface S1 and S2 perpendicular to the Y-axis, first and second end surfaces perpendicular to the X-axis, and first and second principal surfaces perpendicular to the Z-axis. The side surfaces S1 and S2 are cut surfaces corresponding to the cutting lines Lx. The end surfaces are cut surfaces corresponding to the cutting lines Ly. The multilayer chip 114 has a section corresponding to the electrode-stacked portion 16 in which the unfired electrode layers E1 and E2 are stacked. Ends of the unfired electrode layers E1 and E2 are exposed to the side surfaces S1 and S2.

(Step S04: Forming of Side Margin Portions)

Figure 11:
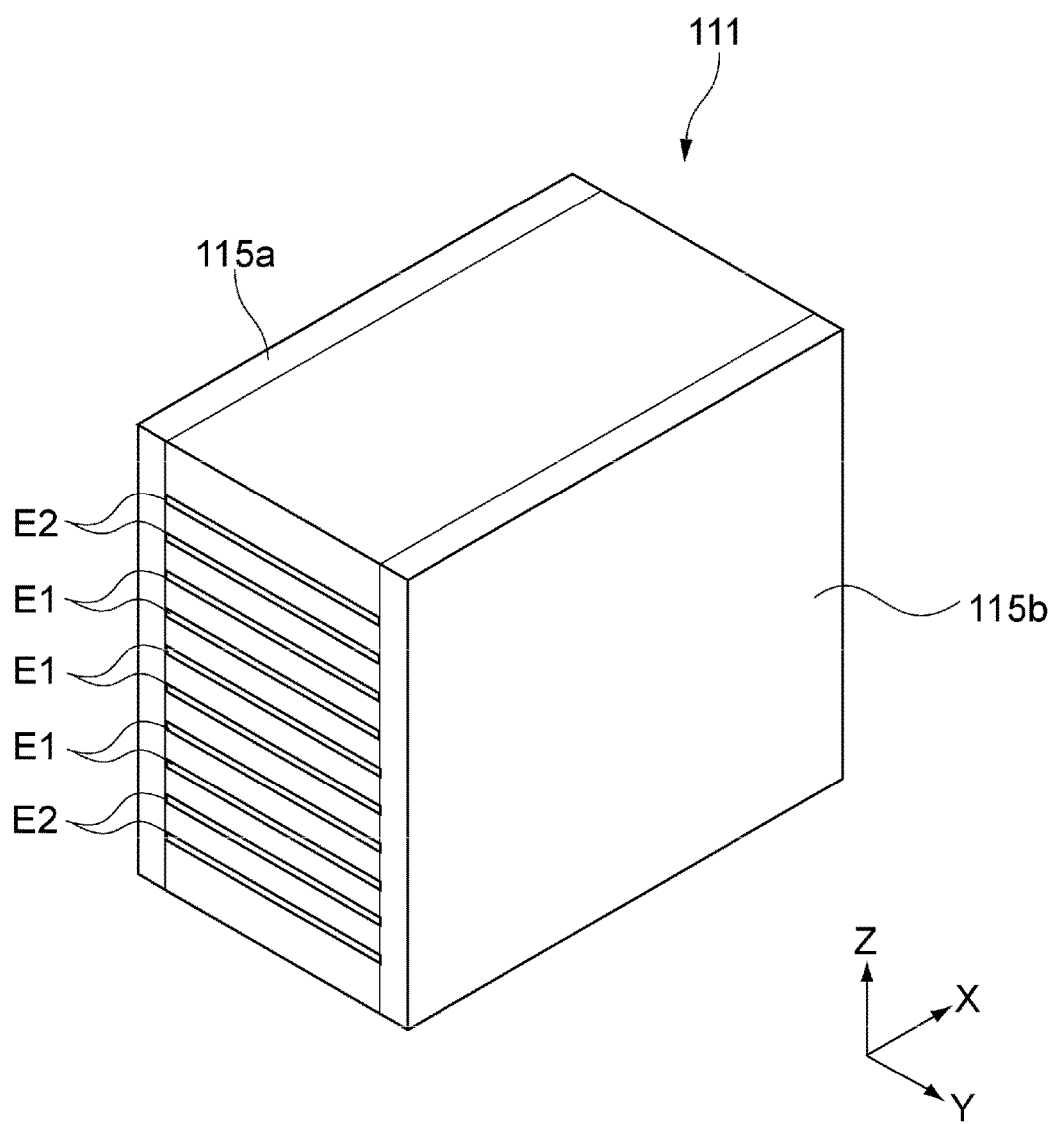
FIG. 11 is a perspective view of an unfired ceramic body in the manufacturing process of the multilayer ceramic capacitor.

In step S04, unfired first and second side margin portions 115a and 115b are provided on the side surfaces S1 and S2 of the multilayer chip 114 obtained in step S03, respectively. As a result, as illustrated in FIG. 11, an unfired ceramic body 111 having the side surfaces S1 and S2 covered with the first and second side margin portions 115a and 115b, respectively, is obtained. The size of the unfired ceramic body 111 is adjusted so that the dimension in the Z-axis direction is larger than the dimension in the Y-axis direction in the ceramic body 11 after firing.

A method of forming the side margin portions 115a and 115b is not particularly limited. For example, the side margin portions 115a and 115b may be formed by punching the ceramic sheet at the side surfaces S1 and S2. Alternatively, the side margin portions 115a and 115b may be formed by applying or dipping a ceramic slurry.

(Step S05: Firing)

In step S05, the ceramic body 111 obtained in step S04 is fired to produce the ceramic body 11 of the multilayer ceramic capacitor 10 illustrated in FIG. 1 to FIG. 3. The ceramic body 11 is configured such that the dimension in the Z-axis direction is larger than the dimension in the Y-axis direction. Through step S05, the side margin portions 115a and 115b become the side margin portions 15a and 15b.

The firing temperature in step S05 can be determined based on the sintering temperature of the ceramic body 111. For example, when a barium titanate ($BaTiO_3$)-based material is used, the firing temperature can be set to about 1000° C. to 1300° C. The firing can be performed, for example, in a reducing atmosphere or a low oxygen partial pressure atmosphere.

In this step, sintering is started from the electrode layers E1 and E2 having a lower sintering temperature. Thereafter, sintering of the cover portions 17a and 17b, the side margin portions 15a and 15b, and the ceramic layers 18, which are made of dielectric ceramic having a higher sintering temperature, is started. With sintering, the electrode layers E1 and E2, which are sintered faster, contract more than the dielectric ceramic.

In the present embodiment, the content ratio of the ceramic material to the conductive material in the second electrode layer E2 is higher than that in the first electrode layer E1. Therefore, the second electrode layers E2 located at the peripheral sides in the Z-axis direction has lower sinterability than the first electrode layers E1 located at the central side in the Z-axis direction. In other words, sintering proceeds more slowly in the second electrode layers E2 than in the first electrode layers E1. As a result, rapid contraction of the second electrode layers E2 is inhibited, and stresses between the second electrode layers E2 and the cover portions 17a and 17b and the side margin portions 15a and 15b around the second electrode layers E2 are reduced.

In addition, excessive sintering of the second electrode layers E2 located at the peripheral sides in the Z-axis direction, which are relatively easily heated, is inhibited. As a result, spheroidization and discontinuity of the second electrode layers E2 are inhibited, and distortion of the ceramic body 11 associated with the spheroidization and discontinuity is also inhibited.

In this step, some of the ceramic particles contained in the electrode layers E1 and E2 may migrate to the outsides of the electrode layers E1 and E2 as the sintering proceeds. However, it is considered that the migration amount of the ceramic particles is not uneven in the electrode-stacked portion 16. Thus, the content ratio of the ceramic material in each of the electrode layers E1 and E2 and the content ratio of the ceramic particles in each of the fired internal electrodes 12a and 12b have a substantially positive correlation. Therefore, by adjusting the content ratio of the ceramic material in the second electrode layer E2 to be greater than that in the first electrode layer E1, the content ratio of the ceramic particles in each of the peripheral internal electrodes 121 and 122 can be adjusted to be greater than that in the central internal electrode 123 even after firing.

(Step S06: Forming of External Electrodes)

In step S06, the multilayer ceramic capacitor 10 illustrated in FIG. 1 to FIG. 3 is produced by forming the external electrodes 13a and 13b on respective ends in the X-axis direction of the ceramic body 11 obtained in step S05. A method of forming the external electrodes 13a and 13b in step S06 can be freely selected from known methods. For example, the external electrodes 13a and 13b may be formed by applying conductive pastes to respective ends of the ceramic body 11 in the X-axis direction and baking the conductive pastes. One or a plurality of plating films may be formed on the baked film.

Through the above steps, the multilayer ceramic capacitor 10 is completed. In this manufacturing method, since the side margin portions 115a and 115b are formed on the side surfaces S1 and S2 of the multilayer chip 114 to which the electrode layers E1 and E2 are exposed, the positions of the ends of the plurality of the internal electrodes 12a and 12b in the Y-axis direction in the ceramic body 11 are aligned within a range of 0.5 μm or less.

Second Embodiment

A method of reducing the sinterability of the peripheral internal electrodes 121 and 122 (the second electrode layers E2) is not limited to the method in which the content ratio of the ceramic particles P in each of the peripheral internal electrodes 121 and 122 (the second electrode layers E2) is adjusted to be larger. For example, as described below, the sinterability of the peripheral internal electrodes 121 and 122 (the second electrode layers E2) may be reduced by adjusting the average particle size of the ceramic particles P.

A multilayer ceramic capacitor in accordance with a second embodiment has a basic configuration similar to that of the multilayer ceramic capacitor 10 illustrated in FIG. 1 to FIG. 3, and thus will be described using the same reference numerals with reference to these drawings.

As illustrated in FIG. 3, also in the present embodiment, the ceramic body 11 of the multilayer ceramic capacitor 10 preferably includes the electrode-stacked portion 16 and the first and second cover portions 17a and 17b, and is configured to have a larger dimension in the Z-axis direction than in the Y-axis direction.

The internal electrodes 12a and 12b of the electrode-stacked portion 16 include a plurality of the first peripheral internal electrodes 121, a plurality of the second peripheral internal electrodes 122, and a plurality of the central internal electrodes 123.

The electrode-stacked portion 16 is divided along the Z-axis direction into the first peripheral section 161 in which the first peripheral internal electrodes 121 are disposed, the central section 163 in which the central internal electrodes 123 are disposed, and the second peripheral section 162 in which the second peripheral internal electrodes 122 are disposed.

Figure 12A:
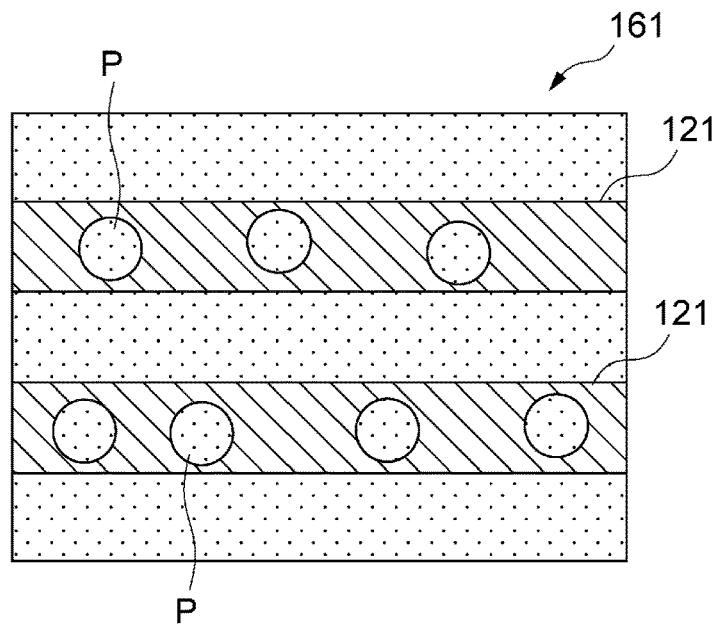
FIG. 12A and FIG. 12B are enlarged views schematically illustrating a part of a multilayer ceramic capacitor in accordance with a second embodiment, FIG. 12A schematically illustrates a part of the first peripheral section, and FIG. 12B schematically illustrates a part of the central section.
Figure 12B:
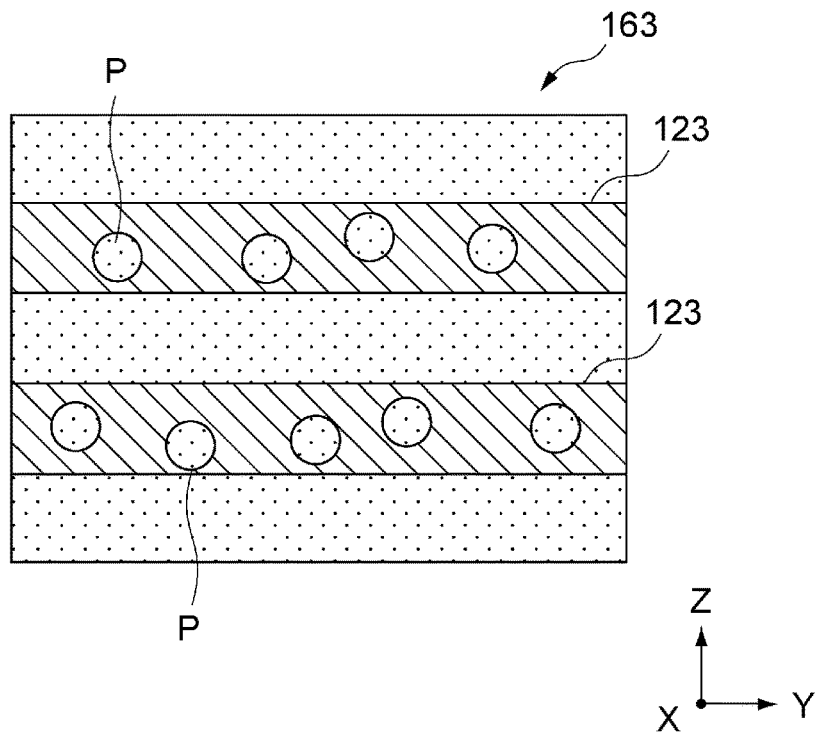

FIG. 12A and FIG. 12B are enlarged views similar to FIG. 5A and FIG. 5B, wherein FIG. 12A schematically illustrates a part of the first peripheral section 161 and FIG. 12B schematically illustrates a part of the central section 163. The second peripheral section 162 is configured in the same manner as the first peripheral section 161, and thus is not illustrated.

In the present embodiment, the sinterability of the peripheral internal electrodes 121 and 122 and the sinterability of the central internal electrodes 123 are controlled by the average particle size of the ceramic particles P. By increasing the average particle size of the ceramic particles P in the internal electrode, sintering of the conductor (metal) in the internal electrode is inhibited, and sintering of the internal electrode can be delayed. As a result, the thermal contraction behavior of the internal electrodes can be brought close to the thermal contraction behavior of the cover portions 17a and 17b and the side margin portions 15a and 15b, and excessive sintering and rapid contraction can be inhibited.

Therefore, in the present embodiment, the average particle size of the ceramic particles P in each of the peripheral internal electrodes 121 and 122 is larger than that in each of the central internal electrodes 123. This can inhibit spheroidization and discontinuity of the peripheral internal electrodes 121 and 122. In addition, rapid contraction of the peripheral sections 161 and 162 in the firing step can be inhibited. Because of these effects of reducing stresses, it is possible to effectively inhibit cracks in the vicinities of the boundary portions between the peripheral sections 161 and 162 and the cover portions 17a and 17b and the boundary portions between the peripheral sections 161 and 162 and the side margin portions 15a and 15b, which are particularly likely to occur in the high-height multilayer ceramic capacitor 10.

In addition, as presented in examples described later, the effect of inhibiting cracks can be enhanced by increasing the average particle size of the ceramic particles P of each of the peripheral internal electrodes 121 and 122 more than that of the central internal electrode 123 rather than uniformly increasing the average particle size of the ceramic particles P of all the internal electrodes 12a and 12b.

The average particle size of the ceramic particles in the internal electrode can be measured, for example, as follows. First, a cross section parallel to the Y-Z plane of the multilayer ceramic capacitor is cut out. This cross section is the cross section of the central portion of the multilayer ceramic capacitor in the X-axis direction. Then, using a scanning electron microscope or a transmission electron microscope, the cross section of each section of the electrode-stacked portion is imaged at a magnification at which about 5 to 15 internal electrodes are included in a visual field. The average particle size of the ceramic particles in the internal electrode is calculated from the captured image.

A method for evaluating the average particle size of the ceramic particles in each section will be described. For example, for 5 to 15 internal electrodes in the vicinity of the outermost layer in the Z-axis direction of the electrode-stacked portion, the average value of the particle diameters of the ceramic particles included in the internal electrodes in the field of view is calculated, and this average value is defined as the average particle size of the ceramic particles in the peripheral internal electrode. Similarly, for 5 to 15 internal electrodes in the central portion in the Z-axis direction of the electrode-stacked portion, the average value of the particle diameters of the ceramic particles included in the internal electrodes in the field of view is calculated, and this average value is defined as the average particle size of the ceramic particles in the central internal electrode. The average particle size is preferably an average particle size of five or more ceramic particles. The calculated average particle size of the ceramic particles in the peripheral internal electrode and the calculated average particle size of the ceramic particles in the central internal electrode are compared with each other to determine whether the average particle size of the ceramic particles in the peripheral internal electrode is larger.

The average particle size of the ceramic particles P in each of the peripheral internal electrodes 121 and 122 is, for example, 10 nm or greater and 30 nm or less. The average particle size of the ceramic particles P in each of the central internal electrodes 123 is, for example, 5 nm or greater and 20 nm or less. The ratio of the average particle size of the ceramic particles P of each of the peripheral internal electrodes 121 and 122 to the average particle size of the ceramic particles P of the central internal electrode 123 is, for example, 1.5 or greater and 5 or less. In order to adjust the average particle size of the ceramic particles P in each of the peripheral internal electrodes 121 and 122 to be larger, the ceramic particles P having a larger average particle size are added to the material for each of the peripheral internal electrodes 121 and 122.

The method of manufacturing the ceramic capacitor of the present embodiment can include the same steps as those of the first embodiment, but the compositions of the electrode layers E1 and E2 are different.

In the present embodiment, the electrode layers E1 and E2 contain ceramic powder, and the average particle size of the ceramic powder in the second electrode layer E2 is larger than that in the first electrode layer E1. Specifically, the average particle size of the ceramic powder in the second electrode layer E2 is, for example, 10 nm or greater and 30 nm or less. The average particle size of the ceramic powder in the first electrode layer E1 is, for example, 5 nm or greater and 20 nm or less. The ratio of the average particle size of the ceramic powder in the second electrode layer E2 to the average particle size of the ceramic powder in the first electrode layer E1 is, for example, 1.5 or greater and 5 or less.

With this configuration, in the firing step in step S05, the sinterability of the second electrode layers E2 located at the peripheral side in the Z-axis direction can be reduced to be lower than the sinterability of the first electrode layers E1 located at the central side in the Z-axis direction. Therefore, cracks in the ceramic body 11 can be effectively inhibited.

As the sintering proceeds, the grain growth of the dielectric ceramic contained in the electrode layers E1 and E2 occurs, so that the particle size of the ceramic powder added to the conductive paste may be different from the particle size of the ceramic particles after firing. On the other hand, as the particle size of the ceramic powder added to the conductive paste is larger, the particle size of the ceramic particles after firing is also likely to be larger. Therefore, it can be said that there is a positive correlation between the average particle size of the ceramic powder added to the conductive paste and the average particle size of the ceramic particles after firing. Therefore, by adjusting the average particle size of the ceramic powder in the second electrode layer E2 to be larger than that in the first electrode layer E1, the average particle size of the ceramic particles P in each of the peripheral internal electrodes 121 and 122 can be adjusted to be larger than that in the central internal electrode 123 even after firing.

Third Embodiment

The sinterability can be adjusted by adjusting the thickness of the internal electrode. In the following description, the same reference numerals are assigned to the configurations that are common to the first embodiment, and the description thereof is omitted.

Figure 13:
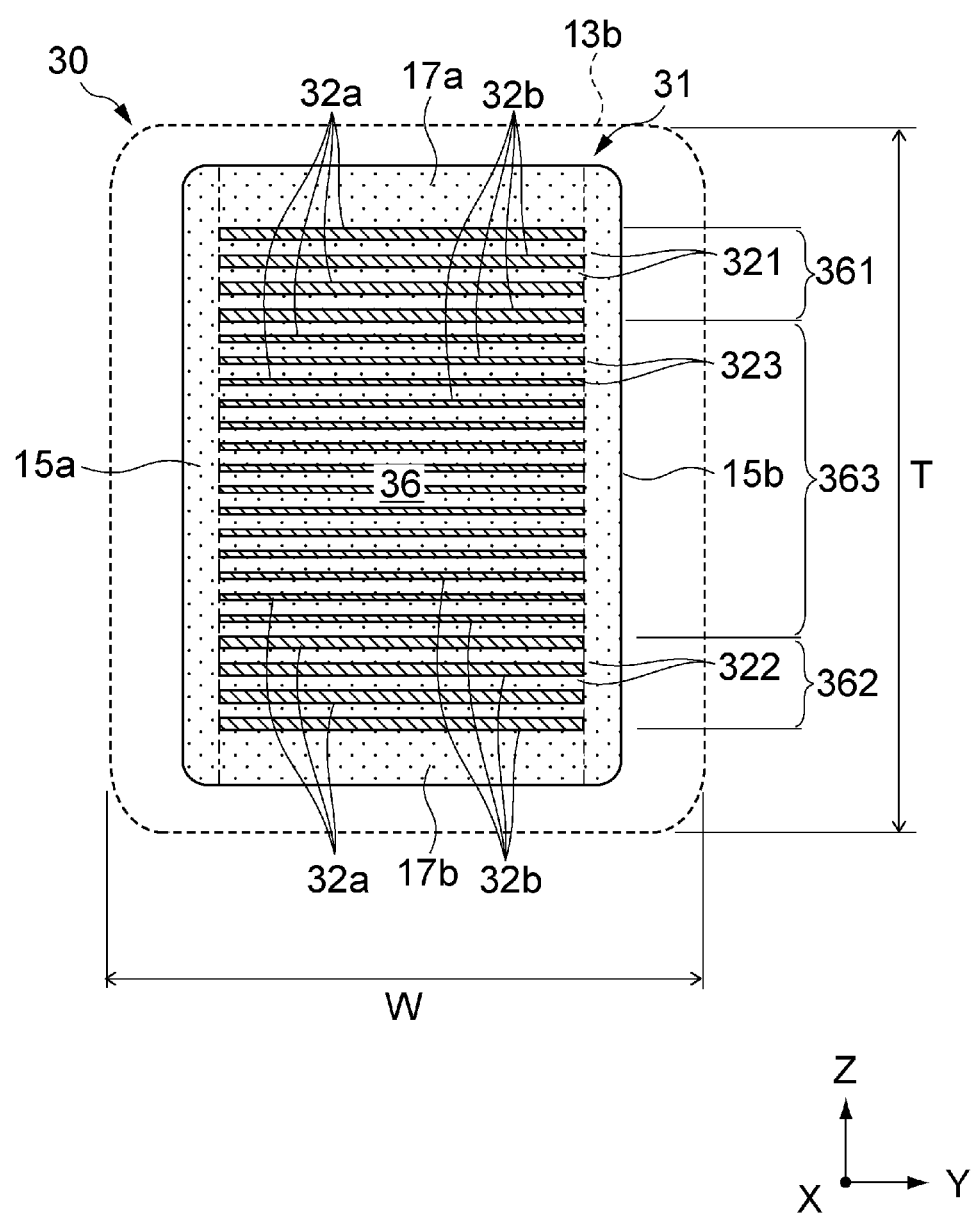
FIG. 13 is a cross-sectional view illustrating a multilayer ceramic capacitor in accordance with a third embodiment, illustrating a cross section at the same position as in FIG. 3.

FIG. 13 is a cross-sectional view of a multilayer ceramic capacitor 30 in accordance with a third embodiment, and illustrates a cross section at the same position as in FIG. 3. As illustrated in FIG. 13, a ceramic body 31 of the multilayer ceramic capacitor 30 includes an electrode-stacked portion 36, the cover portions 17a and 17b, and the side margin portions 15a and 15b, and is configured such that the dimension T in the Z-axis direction is larger than the dimension W in the Y-axis direction.

Internal electrodes 32a and 32b of the electrode-stacked portion 36 include a plurality of first peripheral internal electrodes 321, a plurality of second peripheral internal electrodes 322, and a plurality of central internal electrodes 323.

The electrode-stacked portion 36 is divided along the Z-axis direction into a first peripheral section 361 in which the first peripheral internal electrodes 321 are disposed, a central section 363 in which the central internal electrodes 323 are disposed, and a second peripheral section 362 in which the second peripheral internal electrodes 322 are disposed.

In the present embodiment, the sinterability of each of the peripheral internal electrodes 321 and 322 and the sinterability of each of the central internal electrodes 323 are controlled by the thicknesses of the internal electrodes 32a and 32b. By increasing the thicknesses of the internal electrodes 32a and 32b, sintering of the internal electrodes 32a and 32b can be delayed. This makes it possible to bring the sintering behavior of the internal electrodes 32a and 32b close to the sintering behavior of the cover portions 17a and 17b and the side margin portions 15a and 15b.

Figure 14A:
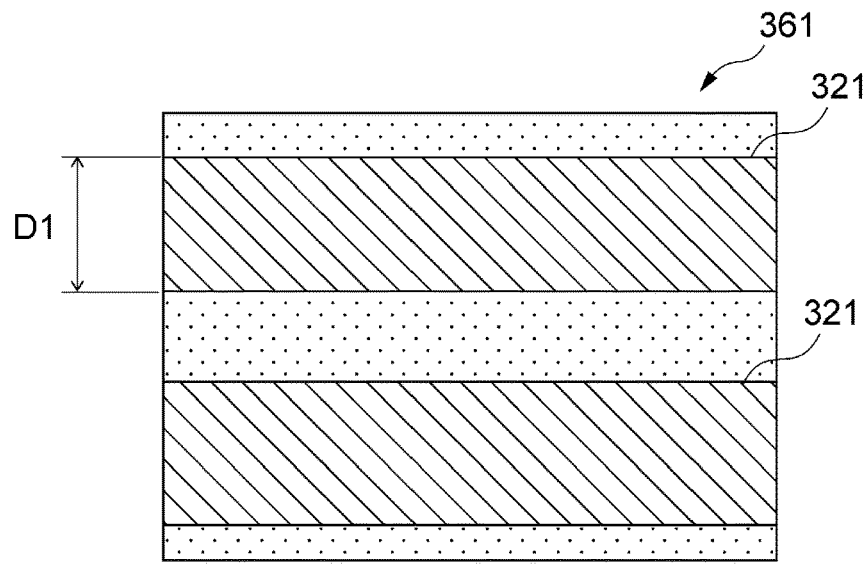
FIG. 14A and FIG. 14B are enlarged views of FIG. 13, FIG. 14A schematically illustrates a part of the first peripheral section of the multilayer ceramic capacitor, and FIG. 14B schematically illustrates a part of the central section of the multilayer ceramic capacitor.
Figure 14B:
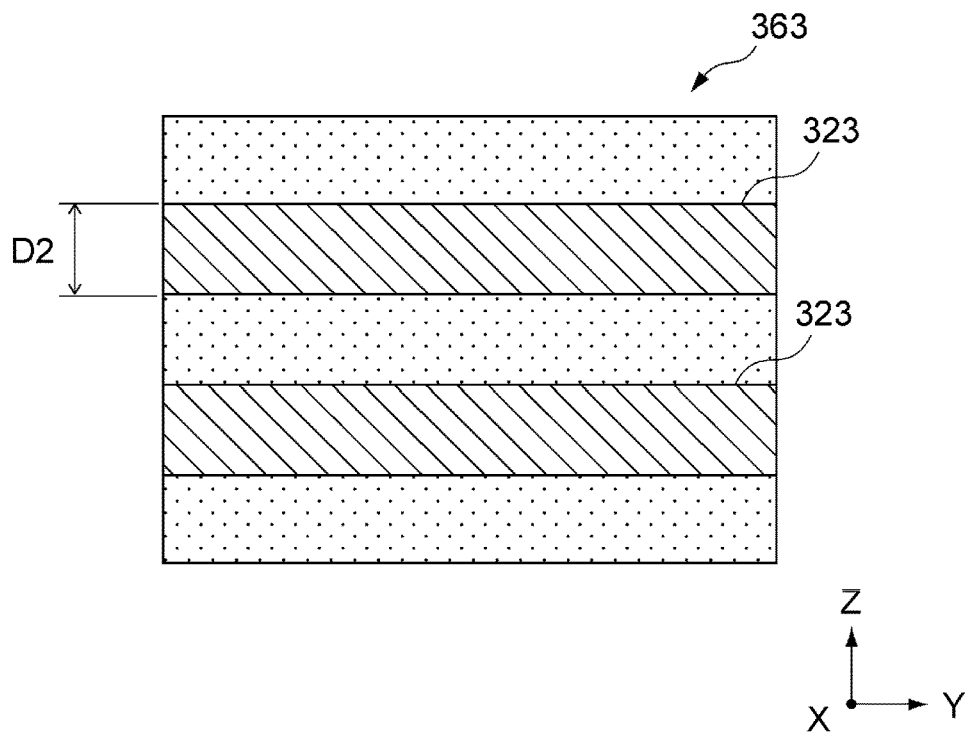

FIG. 14A and FIG. 14B are enlarged views of the electrode-stacked portion 36 illustrated in FIG. 13, FIG. 14A schematically illustrates a part of the first peripheral section 361, and FIG. 14B schematically illustrates a part of the central section 363. The second peripheral section 362 is configured in the same manner as the first peripheral section 361, and thus is not illustrated.

In the present embodiment, each of the peripheral internal electrodes 321 and 322 is thicker in the Z-axis direction than each of the central internal electrodes 323. For example, referring to FIG. 14A and FIG. 14B, the thickness D1 of the first peripheral internal electrode 321 in the Z-axis direction is thicker than the thickness D2 of the central internal electrode 323 in the Z-axis direction. This configuration can inhibit spheroidization and discontinuity of the peripheral internal electrodes 321 and 322. In addition, rapid contraction of the peripheral sections 361 and 362 in the firing step can be inhibited. Because of these effects of reducing stresses, it is possible to effectively inhibit cracks in the vicinities of the boundary portions between the peripheral sections 361 and 362 and the cover portions 17a and 17b and in the vicinities of the boundary portions between the peripheral sections 361 and 362 and the side margin portions 15a and 15b, which are likely to occur particularly in the heigh-height multilayer ceramic capacitor 10.

In the present embodiment, the thicknesses of the internal electrodes 32a and 32b can be measured by the method described in the first embodiment. Specifically, the thickness of each of the peripheral internal electrodes 321 and 322 is, for example, 0.2 µm or greater and 1.5 µm or less. The thickness of each central internal electrode 323 is, for example, 0.1 µm or greater and 1.0 µm or less. The ratio of the thickness of each of the peripheral internal electrodes 321 and 322 to the thickness of each central internal electrode 323 is, for example, 1.5 or greater and 3.0 or less.

In the present embodiment, the internal electrodes 32a and 32b may or may not contain ceramic particles. When the internal electrodes 32a and 32b contain ceramic particles, the content ratio of the ceramic particles in each of the peripheral internal electrodes 321 and 322 is preferably equal to or higher than the content ratio of the ceramic particles in each of the central internal electrodes 323. In this case, the average particle size of the ceramic particles in each of the peripheral internal electrodes 321 and 322 is preferably equal to or larger than the average particle size of the ceramic particles in each central internal electrode 323.

The method of manufacturing the ceramic capacitor of the present embodiment can include the same steps as those of the first embodiment, but the method of forming the electrodes layers E1 and E2 is different.

In the present embodiment, the second electrode layer E2 is formed so as to be thicker than the first electrode layer E1. For example, the thickness of the conductive paste applied as the second electrode layer E2 is adjusted to be larger than the thickness of the conductive paste applied as the first electrode layer E1.

For example, the coating thicknesses of each of the second electrodes E2 is 0.25 µm or greater and 2.0 µm or less. The coating thickness of each of the first electrode layers E1 is, for example, 0.12 µm or greater and 1.5 µm or less. The ratio of the coating thickness of each of the second electrode layers E2 to the coating thickness of each of the first electrode layers E1 is, for example, 1.5 or greater and 3.0 or less.

Accordingly, in the firing step in step S05, the sinterability of the second electrode layer E2 located at the peripheral side in the Z-axis direction can be reduced to be lower than the sinterability of the first electrode layer E1 located at the central side in the Z-axis direction. Therefore, cracks in the ceramic body 31 can be effectively inhibited.

Other Embodiments

Although the embodiments of the present invention have been described above, the present invention is not limited to the above-described embodiments, and various modifications can be made without departing from the scope of the present invention. For example, the embodiment of the present invention can be an embodiment obtained by combining the respective embodiments.

Means for controlling the sinterability of the peripheral internal electrode and the sinterability of the central internal electrode is not limited to the above examples. For example, when the central internal electrode (a first electrode layer) contains more sintering aid than the peripheral internal electrode (a second electrode layer), the sinterability of the peripheral internal electrode (the second electrode layer) can be adjusted to be lower than the sinterability of the central internal electrode. As the sintering aid, a known sintering aid can be used, and examples thereof include manganese (Mn), magnesium (Mg), and silicon (Si).

Alternatively, the average particle size of the conductive powder contained in the second electrode layer may be adjusted to be larger than the average particle size of the conductive powder contained in the first electrode layer. By increasing the particle size of the conductive powder, the surface area per unit volume (or unit mass) of the conductive powder can be reduced. In other words, by increasing the particle size of the conductive powder, the conductive powder becomes less likely to burn, and the sinterability can be reduced.

In the method of manufacturing the multilayer ceramic capacitor, a part of the step of forming the external electrodes in step S06 may be performed before the step of firing in step S05. For example, the application of the conductive paste for forming the external electrodes in step S06 may be performed before step S05, and the sintering of the ceramic body 11 and the baking of the external electrodes may be performed at the same time.

Furthermore, the embodiments of the present invention are applicable not only to multilayer ceramic capacitors but also to general multilayer ceramic electronic components each including a multilayer body and a pair of side margin portions. Examples of the multilayer ceramic electronic component to which the embodiments of the present invention are applicable include chip varistors, chip thermistors, and multilayer inductors, in addition to multilayer ceramic capacitors.

EXAMPLES

Test Example 1

As Test Example 1, an example of the first embodiment will be described. In the following description, "parts" means "parts by mass".

First, a plurality of conductive pastes A to F having different compositions were prepared. The conductive pastes A to F contained a conductor powder made of Ni and an organic vehicle such as an organic solvent, and further contained 0 to 25 parts by mass of a ceramic powder with respect to 100 parts by mass of the conductor powder. The average particle size of the conductor powder was 150 nm. The main component of the ceramic powder was barium titanate, and the average particle size thereof was 30 nm.

The content ratio of the ceramic powder in each of the conductive pastes A to F is presented in Table 1.

TABLE 1

| Name of paste | Conductor powder | Ceramic powder |
|---|---|---|
| A | 100 parts | 0 parts |
| B | 100 parts | 5 parts |
| C | 100 parts | 10 parts |
| D | 100 parts | 15 parts |
| E | 100 parts | 20 parts |
| F | 100 parts | 25 parts |

Each sample of the multilayer ceramic capacitor was fabricated based on the above manufacturing method.

First, a plurality of ceramic green sheets containing barium titanate as a main component were prepared. The average particle size of the ceramic powder of this ceramic green sheet was about 150 nm. One of the conductive pastes A to F was printed on the ceramic green sheet as a central ceramic sheet, and the printed film was used as the first electrode layer. Similarly, one of the conductive pastes A to F was printed on the ceramic green sheet as a peripheral ceramic sheet, and the printed film was used as the second electrode layer. The ceramic green sheet on which no conductive paste was printed was prepared as the cover ceramic sheet. The type of conductive paste used in each sample is presented in Table 2.

TABLE 2

| Sample No | Second electrode layer (at peripheral side) | | First electrode layer (at center side) | | Cracks |
|---|---|---|---|---|---|
| | Name of paste | Parts of ceramic powder | Name of paste | Parts of ceramic powder | |
| 1-1 | D | 15 | D | 15 | Present |
| 1-2 | D | 15 | C | 10 | Absent |
| 1-3 | E | 20 | E | 20 | Present |
| 1-4 | B | 5 | A | 0 | Absent |
| 1-5 | D | 15 | B | 5 | Absent |
| 1-6 | B | 5 | B | 5 | Present |
| 1-7 | A | 0 | C | 10 | Present |
| 1-8 | F | 25 | F | 25 | Present |
| 1-9 | C | 10 | A | 0 | Absent |
| 1-10 | A | 0 | A | 0 | Present |
| 1-11 | E | 20 | A | 0 | Absent |
| 1-12 | E | 20 | D | 15 | Absent |
| 1-13 | C | 10 | C | 10 | Present |
| 1-14 | C | 10 | B | 5 | Absent |

Among samples 1-1 to 1-14, samples 1-2, 1-4, 1-5, 1-9, 1-11, 1-12, and 1-14, in which the content ratio of the ceramic powder in the second electrode layer is greater than the content ratio of the ceramic powder in the first electrode layer, correspond to examples of the present embodiment. Other samples correspond to comparative examples of the present embodiment.

Subsequently, a predetermined number of the cover ceramic sheets, 130 peripheral ceramic sheets, 390 central ceramic sheets, 130 peripheral ceramic sheets, and a predetermined number of the cover ceramic sheets were stacked to prepare a multilayer sheet. Steps S03 to S06 were performed on the multilayer sheet to prepare samples of a multilayer ceramic capacitor.

Each sample was fabricated so that the dimension in the X-axis direction was 1.0 mm, the dimension in the Y-axis direction was 0.5 mm, and the dimension in the Z-axis direction was 0.8 mm. The average thickness of each of the ceramic layers and the internal electrodes after firing was about 0.6 μm, and the thickness of the cover portion was 35 μm.

All of the six surfaces of each sample of the fabricated multilayer ceramic capacitor were visually inspected, and the presence or absence of cracks was evaluated. The results are presented in Table 2.

As presented in Table 2, cracks occurred in samples 1-1, 1-3, 1-6, 1-7, 1-8, 1-10, and 1-13 in which the content ratio of the ceramic powder in the second electrode layer was equal to or less than the content ratio of the ceramic powder in the first electrode layer. On the other hand, in samples 1-2, 1-4, 1-5, 1-9, 1-11, 1-12, and 1-14, in which the content ratio of the ceramic powder in the second electrode layer was larger than the content ratio of the ceramic powder in the first electrode layer, no crack was generated. Accordingly, it was found that the generation of cracks can be inhibited by adjusting the content ratio of the ceramic powder in the second electrode layer to be higher than the content ratio of the ceramic powder in the first electrode layer.

Test Example 2

As Test Example 2, an example of the second embodiment will be described.

First, a plurality of conductive pastes C, G, and H having different compositions were prepared. The conductive paste C was the same as the conductive paste C used in Test Example 1.

Each of the conductive pastes C, G, and H contained a conductive powder made of Ni and an organic vehicle such as an organic solvent, and further contained 10 parts by mass of ceramic powder with respect to 100 parts by mass of the conductive powder. The conductive pastes C, G, and H contained ceramic powders having different average particle sizes. The average particle size of the conductor powder and the average particle size of the ceramic powder in each of the conductive pastes A to F are presented in Table 3.

TABLE 3

| Name of paste | Average particle size of conductor powder | Average particle size of ceramic powder |
| --- | --- | --- |
| C | 150 nm | 30 nm |
| G | 150 nm | 20 nm |
| H | 150 nm | 10 nm |

Each sample of the multilayer ceramic capacitor was fabricated in the same manner as in Test Example 1. The type of conductive paste used in each sample is presented in Table 4. Among samples 2-1 to 2-7, samples 2-2, 2-3, and 2-5, in which the average particle size of the ceramic powder in the second electrode layer is larger than the average particle size of the ceramic powder in the first electrode layer, correspond to examples of the present embodiment. Other samples correspond to comparative examples of the present embodiment.

TABLE 4

| | Second electrode layer (at peripheral side) | | First electrode layer (at center side) | | |
| --- | --- | --- | --- | --- | --- |
| Sample No. | Name of paste | Average particle size of ceramic powder (nm) | Name of paste | Average particle size of ceramic powder (nm) | Cracks |
| 2-1 | C | 30 | C | 30 | Present |
| 2-2 | C | 30 | G | 20 | Absent |
| 2-3 | C | 30 | H | 10 | Absent |
| 2-4 | G | 20 | G | 20 | Present |

TABLE 4-continued

| | Second electrode layer (at peripheral side) | | First electrode layer (at center side) | | |
| --- | --- | --- | --- | --- | --- |
| Sample No. | Name of paste | Average particle size of ceramic powder (nm) | Name of paste | Average particle size of ceramic powder (nm) | Cracks |
| 2-5 | G | 20 | H | 10 | Absent |
| 2-6 | H | 10 | H | 10 | Present |
| 2-7 | H | 10 | C | 30 | Present |

All of the six surfaces of each sample of the fabricated multilayer ceramic capacitor were visually inspected, and the presence or absence of cracks was evaluated. The results are presented in Table 4.

As presented in Table 4, cracks occurred in samples 2-1, 2-4, 2-6, and 2-7 in which the average particle size of the ceramic powder in the second electrode layer was equal to or less than the average particle size of the ceramic powder in the first electrode layer. On the other hand, in samples 2-2, 2-3, and 2-5 in which the average particle size of the ceramic powder in the second electrode layer was larger than the average particle size of the ceramic powder in the first electrode layer, no cracks were generated. Accordingly, it was found that occurrence of cracks can be inhibited by adjusting the average particle size of the ceramic powder in the second electrode layer to be larger than the average particle size of the ceramic powder in the first electrode layer.

Test Example 3

As Test Example 3, an example of the third embodiment will be described.

The conductive paste C used in Test Examples 1 and 2 was prepared. Samples 3-1 to 3-5 of the multilayer ceramic capacitor were fabricated in the same manner as in Test Example 1. However, in samples 3-1 to 3-5, the coating thickness of the conductive paste C in each of the first and second electrode layers was set as presented in Table 5. The number of stacked first and second electrode layers in each sample was also set as presented in Table 5. Among samples 3-1 to 3-5, samples 3-1 and 3-2, in which the coating thickness of the second electrode layer is thicker than the coating thickness of the first electrode layer, correspond to examples of the present embodiment. Other samples correspond to comparative examples of the present embodiment.

TABLE 5

| | Second electrode layer (at peripheral side) | | | First electrode layer (at center side) | | | |
| --- | --- | --- | --- | --- | --- | --- | --- |
| Sample No. | Name of paste | Coating thickness of paste (um) | Number of stacked layers | Name of paste | Coating thickness of paste (um) | Number of stacked layers | Cracks |
| 3-1 | C | 1.5 | 85 | C | 0.7 | 390 | Absent |
| 3-2 | C | 1.0 | 110 | C | 0.7 | 390 | Absent |
| 3-3 | C | 0.7 | 130 | C | 0.7 | 390 | Present |
| 3-4 | C | 1.5 | 85 | C | 1.5 | 260 | Present |
| 3-5 | C | 0.7 | 130 | C | 1.5 | 260 | Present |

All of the six surfaces of each sample of the fabricated multilayer ceramic capacitor were visually inspected, and the presence or absence of cracks was evaluated. The results are presented in Table 5.

As presented in Table 5, in samples 3-3, 3-4, and 3-5 in which the coating thickness of the conductive paste in the second electrode layer was equal to or less than the coating thickness of the conductive paste in the first electrode layer, cracks occurred. On the other hand, in samples 3-1 and 3-2 in which the coating thickness of the conductive paste in the second electrode layer was thicker than the coating thickness of the conductive paste in the first electrode layer, no cracks were generated. Accordingly, it was found that the occurrence of cracks can be inhibited by adjusting the coating thickness of the conductive paste in the second electrode layer to be thicker than the coating thickness of the conductive paste in the first electrode layer.

What is claimed is:

1. A multilayer ceramic electronic component comprising:
   a ceramic body including:
      an electrode-stacked portion that includes a plurality of ceramic layers stacked in a direction of a first axis and a plurality of internal electrodes disposed between the plurality of ceramic layers and alternately led out to respective sides along a second axis orthogonal to the first axis,
      first and second cover portions opposed to each other in the direction of the first axis with the electrode-stacked portion interposed therebetween, and
      first and second side margin portions opposed to each other in a direction of a third axis orthogonal to the first axis and the second axis with the electrode-stacked portion interposed therebetween; and
   first and second external electrodes connected to the plurality of internal electrodes and opposed to each other in a direction of the second axis across the ceramic body,
   wherein a dimension in the direction of the first axis of the ceramic body is larger than a dimension in the direction of the third axis of the ceramic body, and
   wherein the plurality of internal electrodes contain ceramic particles, and
   wherein the plurality of internal electrodes include:
      a plurality of first peripheral internal electrodes collectively disposed in a peripheral portion at a side of the first cover portion in the direction of the first axis,
      a plurality of second peripheral internal electrodes collectively disposed in another peripheral portion at a side of the second cover portion in the direction of the first axis, and
      a plurality of central internal electrodes collectively disposed closer to a center in the direction of the first axis than the plurality of first peripheral internal electrodes and the plurality of second peripheral internal electrodes, and
   wherein an average particle size of ceramic particles contained in each of the plurality of first peripheral internal electrodes and the plurality of second peripheral internal electrodes is larger than an average particle size of ceramic particles contained in each of the plurality of central internal electrodes.

2. The multilayer ceramic electronic component according to claim 1,
   wherein positions of ends of the plurality of internal electrodes in the direction of the third axis are aligned with each other within a range of 0.5 μm in the direction of the third axis.

3. The multilayer ceramic electronic component according to claim 1,
   wherein the electrode-stacked portion is divided along the direction of the first axis into a first peripheral section in which the plurality of first peripheral internal electrodes are disposed, a central section in which the plurality of central internal electrodes are disposed, and a second peripheral section in which the plurality of second peripheral internal electrodes are disposed, and
   wherein a dimension of each of the first and second peripheral sections in the direction of the first axis is 10% or greater and 30% or less of a dimension of the electrode-stacked portion in the direction of the first axis.

* * * * *